(12) United States Patent
Greenberg et al.

(10) Patent No.: US 10,761,184 B2
(45) Date of Patent: Sep. 1, 2020

(54) POLARIMETRIC PHASED ARRAY RADAR SYSTEM AND METHOD FOR OPERATING THEREOF

(71) Applicant: ISRAEL AEROSPACE INDUSTRIES LTD., Lod (IL)

(72) Inventors: Igal Greenberg, Hod Hasharon (IL); Orna Boeko, Petach Tikva (IL); Vladimir Rojanski, Petach Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 198 days.

(21) Appl. No.: 16/077,608

(22) PCT Filed: Feb. 7, 2017

(86) PCT No.: PCT/IL2017/050149
§ 371 (c)(1),
(2) Date: Aug. 13, 2018

(87) PCT Pub. No.: WO2017/141232
PCT Pub. Date: Aug. 24, 2017

(65) Prior Publication Data
US 2019/0041493 A1 Feb. 7, 2019

(30) Foreign Application Priority Data

Feb. 21, 2016 (IL) .......................... 244204

(51) Int. Cl.
*G01S 7/02* (2006.01)
*G01S 13/44* (2006.01)
(Continued)

(52) U.S. Cl.
CPC .............. *G01S 7/025* (2013.01); *G01S 7/026* (2013.01); *G01S 7/411* (2013.01); *G01S 13/4463* (2013.01); *G01S 2013/0245* (2013.01)

(58) Field of Classification Search
CPC .......... G01S 7/025; G01S 7/026; G01S 7/411; G01S 13/4463; G01S 2013/0245; G01S 2013/0254; G01S 2013/0263
See application file for complete search history.

(56) References Cited

U.S. PATENT DOCUMENTS 7,825,847 B2 * 11/2010 Fujimura ................ G01S 7/025
342/25 R
2012/0044105 A1 * 2/2012 Bachmann .............. G01S 7/025
342/188

FOREIGN PATENT DOCUMENTS

WO 02/37611 A2 5/2002

* cited by examiner

*Primary Examiner* — Vladimir Magloire
*Assistant Examiner* — Michael W Justice
(74) *Attorney, Agent, or Firm* — Browdy and Neimark, P.L.L.C.

(57) ABSTRACT

A polarimetric phase array radar system (PPARS) for determination of parameters of a target and a method of operating the PPARS are described. The PPARS includes an array having transceiver elements configured to transmit transmitting signal components of a dual-polarization signal having either a single type polarization or simultaneously two types of polarization. The array also configured to receive a receiving signal component having a single type of polarization. In transmitting mode, the transceiver elements are operative to transmit a signal component having one or two types of polarization. In receiving mode, the transceiver elements are divided into at least two sub-arrays. Each sub-array includes a first portion of the transceiver elements and a second portion of the transceiver elements, and is operative to receive a signal component having a first type polarization by the first portion of the transceiver elements and a signal component having a second type polarization by the second portion of the transceiver elements.

20 Claims, 16 Drawing Sheets

(51) Int. Cl.
*G01S 7/41* (2006.01)
*G01S 13/02* (2006.01)

Fig. 16B

POLARIMETRIC PHASED ARRAY RADAR SYSTEM AND METHOD FOR OPERATING THEREOF

TECHNOLOGICAL FIELD

The present invention relates generally to radar systems, and in particular, to polarimetric phase array radar systems for determination of a target range, an elevation angle and an azimuth angle of a target.

BACKGROUND

An array antenna used in radar systems includes a plurality of individually radiating antenna elements. In some array antennas, the individual antenna elements are coupled to a transmitter through phase shifters and attenuators configured for controlling the phase and amplitude of the transmitted signal. Similarly, the individual antenna elements are coupled to a receiver through phase shifters and attenuators configured for controlling the phase and amplitude of the received signal. A device comprising both a transmitter and a receiver which are combined and share common circuitry is here referred to as a transceiver. The relative phase and amplitude of the radio frequency signal passing between the plurality of antenna elements and a corresponding plurality of individual transceiver elements are controlled to obtain a desired radiation pattern. The pattern obtained is a result of the combined action of all the individual transceiver and antenna elements.

In the past, radars were used to transmit and receive radio waves having only a single polarization. As a consequence, a target which can reflect only a singly polarized beam perpendicular to the incident polarized beam has the potential of being invisible, even if a target has a strong reflection coefficient.

Polarimetric systems (also referred to as "dual polarization systems") have been used primarily because of their properties regarding signal to clutter enhancement or improved target classification and identification. Polarimetric radars transmit and receive both horizontal and vertical polarizations. Beams having horizontal polarization provide essential information about horizontal "properties" of the target, whereas vertically polarized beams provide essential information about vertical "properties" of the target. Since the power returned from the radar is a complicated function of the target size, shape, orientation, density, reflectivity, etc, the additional information received from the second type of polarization can provide improved target detection.

A monopulse radar technique and/or a radar interferometric technique can be used to gather angle information about a target, for example, when used in a tracking radar.

The basic monopulse radar system uses four antennas, or four quadrants of a single antenna that are controlled together. The target is illuminated by all four quadrants, and a comparator network is used to produce four return signals. These return signals include a "sum" signal ($\Sigma$) that is a combination of the received signal from all four quadrants, an elevation angle difference signal ($\Delta_E$) that is formed by subtracting the signal from the two upper quadrants from the signal from the two lower quadrants and an azimuth angle difference signal ($\Delta_A$) formed by subtracting the signals from the left quadrants from the signals from right quadrants. In a tracking radar, the sum signal is used to track the target's distance from the monopulse radar system and the azimuth difference signal is used to determine the target's position to the left or right of the radar system. The elevation difference signal may be used to determine the target's position relative to the horizon.

A radar interferometer is a receiving system that determines the angle of arrival of a wave by a phase comparison of the signals received at separate antennas or separate points on the same antenna.

Monopulse phased array systems are known in the art. These systems include a number of antenna elements arranged in an array. Each of the antenna elements is connected to a T/R (transmitter/receiver) module through a corresponding transmitting/receiving channel, which is under the control of a beam steering system. The beam steering system is fed by a transmitting signal from the T/R module for forming a transmitting beam. Upon reception of reflected signals, a sum signal, an elevation difference signal, and an azimuth difference signal are taken from the beam steering system. The phased array system includes a combination unit that combines the signals received from all the antenna elements and derives a total sum signal ($\Sigma$), a total elevation angle difference signal ($\Delta_E$) and a total azimuth angle difference signal ($\Delta_A$) from which regulation signals ($\Delta_E/\Sigma$) and ($\Delta_A/\Sigma$) for re-steering the transmitting beam generated under the control of the beam steering system can be obtained.

GENERAL DESCRIPTION

In a conventional polarimetric phased array radar system (PPARS) every antenna element receives, simultaneously, signals having two types of polarization, e.g., horizontal polarization and vertical polarization. Accordingly, two separate receiving channels are required for each antenna element coupled through multi-mode antenna feeds of the element.

Problems exist with phased array systems having two channels for each antenna element. A double number of parts is required when compared to a singly polarized phased array radar system that results in complexity of development and in increased cost of production. Moreover, it increases size and weight of the system, requires increased power, and produces increased heat that in turn limits the maximum operating time of the antenna and/or imposes restrictions on the environmental conditions in which the system can operate.

Thus, there is still a need in the art for, and it would be useful to have, a novel polarimetric phase array radar system with a reduced number of parts and, thus, reduced sizes and costs, and increased reliability in use.

The present invention partially eliminates the deficiencies of the prior art polarimetric phase array radar systems without deterioration of the performance of the antenna, and provides a polarimetric phase array radar system for determination of at least one parameter of a target. The parameter of the target is selected from a target range, a target elevation angle and a target azimuth angle.

The polarimetric phase array radar system includes an array having a plurality of transceiver elements configured to transmit radar transmitting signal components of a dual-polarization radar signal having either a single type polarization or simultaneously two types of polarization. The array of transceiver elements also configured to receive a radar receiving signal component having a single type of polarization.

In transmitting mode, the plurality of transceiver elements is operative to transmit a radar signal component having one or two types of polarization.

In receiving mode, the plurality of transceiver elements is divided into at least two sub-arrays. Each sub-array includes a first portion of the transceiver elements and a second portion of the transceiver elements, and is operative to receive a radar signal component having a first type polarization by the first portion of the transceiver elements and to receive a radar signal component having a second type polarization by the second portion of the transceiver elements.

According to one example, the first and second types of polarization are horizontal polarization and vertical polarization.

According to one example, the first and second types of polarization are left-handed circular polarization and right handed circular polarization.

The first portion of the transceiver elements has a first predetermined dynamic distribution, and the second portion of the transceiver elements has a second predetermined dynamic distribution. The first and second predetermined dynamic distributions depend at least on a total number of the transceiver elements, on operating frequency and on at least one parameter of the target.

The polarimetric phase array radar system also includes a signal processing unit coupled to the transceiver elements, and is configured for processing radar receiving signal components having different polarization and generating the target parameters.

According to an embodiment of the present invention, the plurality of transceiver elements is divided into four sub-arrays. The four sub-arrays are arranged in four quadrant parts of the array selected from an upper left part, an upper right part, a lower left part and a lower right part of the array, correspondingly.

According to an embodiment of the present invention, for each sub-array of the four sub-arrays, the first and second portions of the transceiver elements have phase centers located in the corresponding quadrant part.

According to one embodiment of the present invention, for each sub-array, all the transceiver elements of the first and second portions are located in a corresponding quadrant part of the array.

According to another embodiment of the present invention, for each sub-array, a majority of the transceiver elements of the first and/or second portions is located in one quadrant part of the array, while a minority of the transceiver elements of the first and/or second portions is located in neighboring quadrant parts of the array.

According to an embodiment of the present invention, for each sub-array, of the four sub-arrays, the transceiver elements of the first portion are interleaved with the transceiver elements of the second portion.

According to an embodiment of the present invention, the first and second predetermined dynamic distributions of the transceiver elements of the first and second portions are stored in the form of look-up tables.

According to an embodiment of the present invention, each transceiver element of the polarimetric phase array radar system includes an antenna element having first and second multi-mode antenna feeds configured for transmitting and receiving a dual-polarization radar signal that includes first and second signal components having first and second types of polarization, correspondingly.

The transceiver element also includes a radio frequency source configured for generating a radar transmitting signal and a power distributing element electrically coupled to the radio frequency source. The power distributing element is configured to distribute the radar signal generated by the radio frequency source between a first line coupled to the first multi-mode antenna feed for transmitting the first signal component having the first type of polarization and a second line coupled to the second multi-mode antenna feed for transmitting the second signal component having the second type of polarization.

The transceiver element also includes first and second transmitter phase shifters arranged in the first and second lines downstream of the power distributing element. The first and second transmitter phase shifters are configured to provide required phase shifts to first and second transmitting signal components transferred in the first and second lines, correspondingly.

According to an embodiment of the present invention, the power distributing element includes a radio frequency (RF) power one-to-two divider. The RF power one-to-two divider is configured for splitting the transmitting signal generated by the radio frequency source simultaneously into a first transmitting signal component relayed to the first line and a second transmitting signal component relayed to the second line.

According to another embodiment of the present invention, the power distributing element includes a radio frequency power switch configured to selectively couple the radar transmitting signal generated by the radio frequency source to the first line when the switch is in a switch first position and to the second line when the switch is in a switch second position.

The transceiver element also includes a first duplexer and a second duplexer arranged downstream of the first and a second phase shifters, correspondingly. The first duplexer and second duplexer are configured in transmitting mode, to provide shifted transmitting signal components in the first and second transmitting lines to the first and second multi-mode antenna feeds for transmitting the first and second transmitting signal components having the first and second types of polarization, correspondingly. The first duplexer and second duplexer are configured in receiving mode, to receive first and second receiving signal components having the first and second types of polarization provided by the first and second multi-mode antenna feeds and to provide the first and second receiving signal components to a receiving line.

The transceiver element also includes a selecting switch arranged in the receiving line and coupled to the first and second duplexers. The selecting switch is configured for switching between receiving the first receiving signal component provided by the antenna element and having the first type of polarization and the second receiving signal component provided by the antenna element and having the second type of polarization.

The transceiver element also includes a receiver phase shifter coupled to the selecting switch and configured to receive (i) the first receiving signal component having the first type of polarization from the selecting switch when the selecting switch is in a first position, and (ii) the second receiving signal component having the second type of polarization when the selecting switch is in a second position. The receiver phase shifter provides a required phase shift to the receiving signal component transferred through the receiver phase shifter, and generates a shifted receiving signal component of a single type of polarization.

The transceiver element also includes a transceiver element comprising an amplifier/attenuator unit arranged downstream of the selecting switch and configured for a desired tapering of power of the receiving signal components of the dual-polarization radar signal received on an aperture of the antenna element.

The present invention further provides a method of operating the polarimetric phase array radar system described above for determination of the target parameter. The method includes in the transmitting mode, operating said plurality of transceiver elements to transmit a radar signal component having at least one type of polarization.

In the receiving mode, the method includes selecting at least two sub-arrays from the array of the plurality of transceiver elements. Each sub-array includes a first portion of the transceiver elements and a second portion of the transceiver elements. For each sub-array, a first predetermined dynamic distribution is provided to the first portion of the transceiver elements, and a second predetermined dynamic distribution is provided to the second portion of the transceiver elements. The first and second predetermined dynamic distributions depend at least on one characteristic selected from a total number transceiver elements, an operating frequency and said at least one target parameter.

The method also includes receiving a radar signal component having one type of polarization by a first portion of the transceiver elements and receiving a radar signal component having another type of polarization by a second portion of the transceiver elements, and calculating at least one parameter of the target.

According to an embodiment of the present invention, the selecting of at least two sub-arrays includes selecting four sub-arrays of the transceiver elements, and calculating one or more parameters of the target by applying a monopulse tracking technique. According to this embodiment, the calculating of one or more parameters of the target includes: summing signal components having at least one type of polarization received from the four sub-arrays to calculate a four sub-array sum signal ($\Sigma$), and summing signal components having at least one type of polarization received from any two sub-arrays to calculate a first two sub-array sum signal and from two other sub-arrays to calculate a second two sub-array sum signal. Then, a difference signal ($\Delta$) between the first two sub-array sum signal and the second two sub-array sum signal is generated. The method further includes processing the four sub-array sum signal ($\Sigma$) and the difference signal ($\Delta$) for generating the target parameters.

According to another embodiment of the present invention, the selecting of at least two sub-arrays includes selecting two sub-arrays of the transceiver elements, and calculating one or more parameters of the target by applying an interferometric technique. According to this embodiment, the calculating of one or more parameters of the target includes generating a phase difference signal between the signal components having at least one type of polarization received from said at least two sub-arrays, and calculating a distance between phase centers of the transceiver elements of said at least two sub-arrays for at least one portion of the transceiver elements selected from the first portion and second portion and corresponding to said at least one type of polarization. The phase difference signal and the distance between phase centers are processed for generating the target parameters.

According to an embodiment of the present invention, the method includes tapering of a power of the signal components of the radar signal received on an aperture of antenna elements for reducing side lobs level to a desired magnitude.

The polarimetric phase array radar system of the present invention has many of the advantages of the prior art techniques, while simultaneously overcoming some of the disadvantages normally associated therewith.

The polarimetric phase array radar system according to the present invention may be adapted for certain applications, in which size and cost are critical, such as airborne and/or space radar systems.

The polarimetric phase array radar system according to the present invention may be easily and efficiently manufactured.

The polarimetric phase array radar system according to the present invention is of durable and reliable construction.

The polarimetric phase array radar system according to the present invention may have lower overall operation and maintenance costs.

The polarimetric phase array radar system according to the present invention may have a relatively low manufacturing cost.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 15A and 15B schematically illustrate examples of an arrangement of the antenna elements of the transceiver elements in the array of the polarimetric phase array radar system shown in FIG. 1 that utilizes the interferometric method for determination of the azimuth angle of a target;

FIGS. 16A and 16B schematically illustrate examples of an arrangement of the antenna elements of the transceiver elements in the array of the polarimetric phase array radar system shown in FIG. 1 that utilizes the interferometric method for determination of the elevation angle of a target.

DETAILED DESCRIPTION OF EMBODIMENTS

Figure 1:
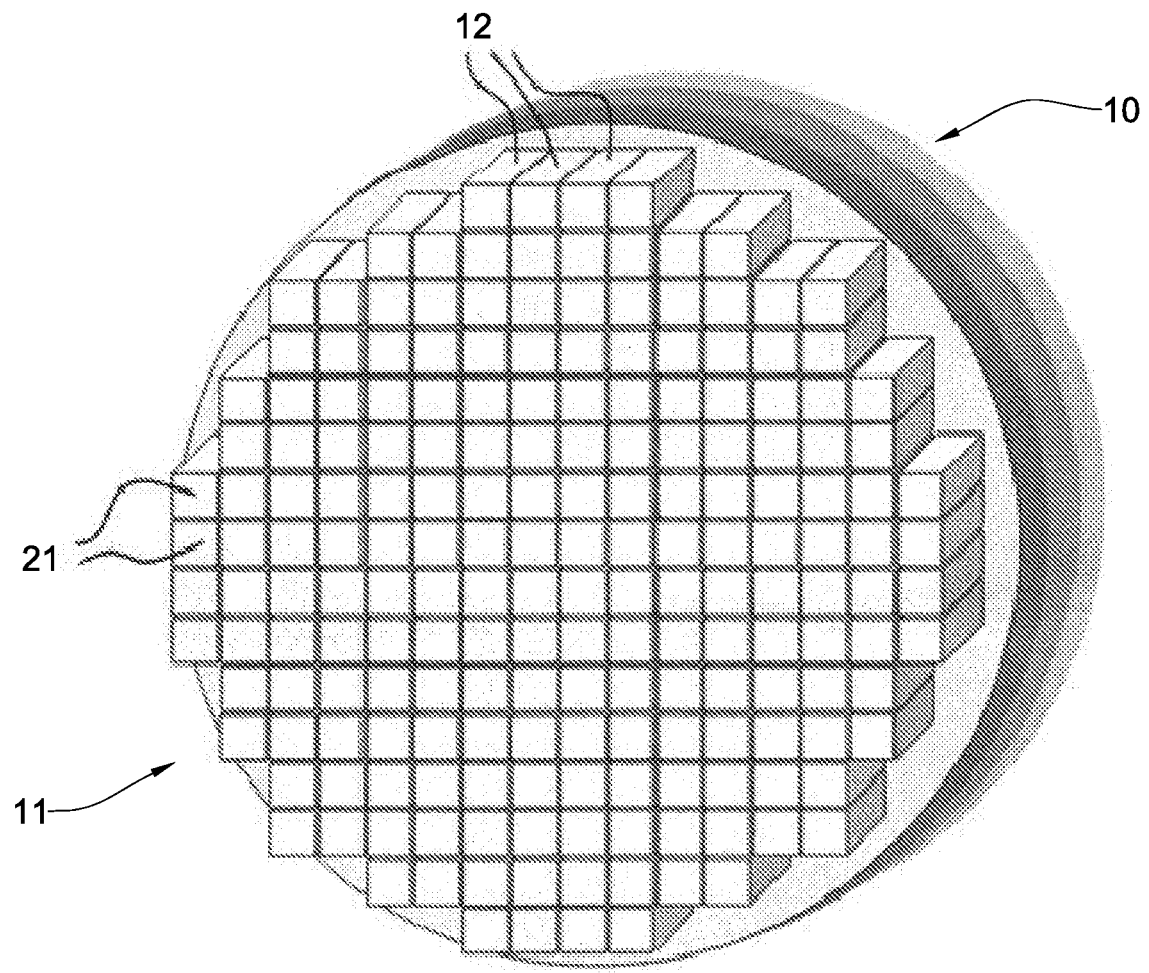
FIG. 1 shows a polarimetric phase array radar system for determination of at least one parameter of a target, according to an embodiment of the present invention.

The principles of the polarimetric phase array radar system (PPARS) according to the present invention may be better understood with reference to the drawings and the accompanying description, wherein like reference numerals have been used throughout to designate identical elements. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

It should be noted that the blocks as well as other elements in these figures are intended as functional entities only, such that the functional relationships between the entities are shown, rather than any physical connections and/or physical relationships. Those versed in the art should appreciate that many of the examples provided have suitable alternatives which may be utilized.

Referring to FIG. 1, a polarimetric phase array radar system 10 for determination of at least one parameter of a target is illustrated, according to an embodiment of the present invention. Examples of the target parameters include, but are not limited to, a target range, a target elevation angle and a target azimuth angle.

The polarimetric phase array radar system 10 includes an array 11 comprising a plurality of transceiver elements 12. The transceiver elements 12 are configured to transmit radar signal components of a dual-polarization radar signal that have either a single type polarization or simultaneously two types of polarization. Moreover, the transceiver elements 12 are configured to receive a radar signal component having only a single type of polarization. According to one example, the two types of polarization can be horizontal polarization and vertical polarization. According to another example, the two types of polarization can be left-handed circular polarization and right handed circular polarization.

Thus, in the system of the present invention, there is a need only in one receiving channel for one type of polarization for each antenna element coupled through the multi-mode antenna feeds of the element. Accordingly, the number of parts that is required for implementation of the transmitter of the present invention is reduced when compared to a conventional polarimetric phased array system in which every antenna element is coupled to two separate receiving channels transferring simultaneously signals having two types of polarization. Thus, the complexity of development of the system of the present invention, having only one receiving channel, may be reduced and the cost of production may be decreased. Moreover, the system size and weight of the system of the present invention may be decreased when compared to a conventional polarimetric phased array system. Likewise, the system of the present invention may require decreased electric power and produce decreased heat during operation.

Each transceiver element 12 includes an antenna element 21 having multi-mode antenna feeds (not shown) configured for transmitting and receiving a dual-polarization radar signal through corresponding receiving/transmitting channels.

According to one embodiment of the present invention, the antenna elements 21 of the transceiver elements 12 are mounted on a flat plate (not shown) and have a plain arrangement.

According to another embodiment of the present invention, the antenna elements 21 of the transceiver elements 12 are spatially positioned.

Figure 2:
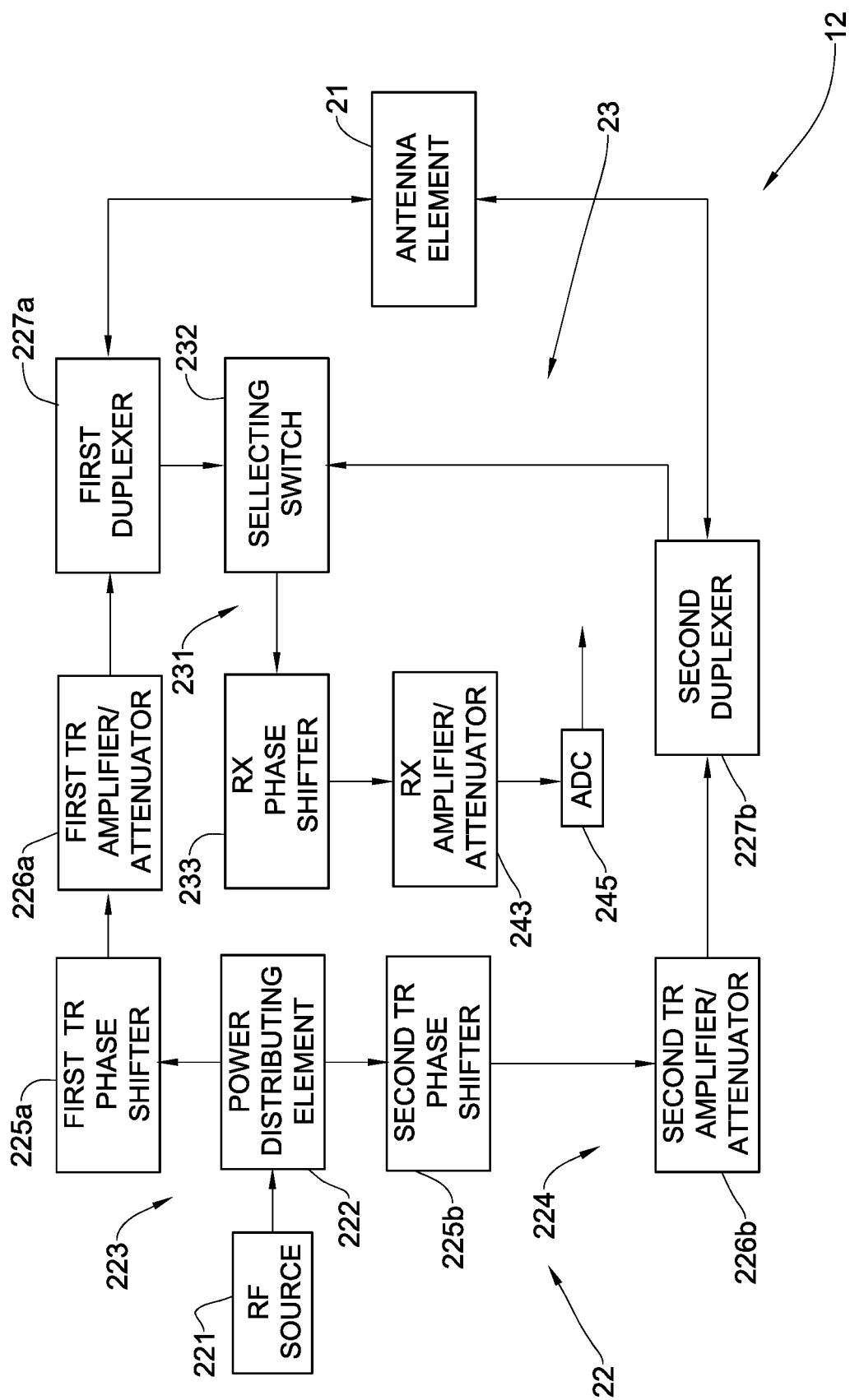
FIG. 2 shows a schematic block diagram of the transceiver element for the phase array radar system shown in FIG. 1, according to an embodiment of the present invention.

Referring to FIG. 2, the transceiver element 12 for a phase array radar system shown in FIG. 1 is illustrated, according to an embodiment of the present invention. The transceiver element includes the antenna elements 21 having multi-mode antenna feeds (not shown) configured for transmitting and receiving a dual-polarization radar signal.

It should be noted that the subject of this invention is not limited to any particular implementation of the antenna elements 21. Hence, the antenna elements 21 may be implemented in various alternatives. Examples of the radiating elements 21 include, but are not limited to, patch antenna elements; stacked patch antenna elements, microstrip antenna elements, dipole antenna elements, horn antenna elements, tapered-Slot Antenna (TSA) elements (also known as Vivaldi) and other antenna elements or a combination thereof. Consequently, the type, shape and configuration of the antenna elements 21 may be selected to be suitable for the technology adopted for the antenna array.

The transceiver element 12 includes a transmitting portion 22 and a receiving portion 23. The transmitting portion 22 of the transceiver element 12 includes a radio frequency (RF) source 221 having an input waveform generator (not shown) configured for generating an RF radar signal. The transmitting portion 22 further includes a power distributing element 222 electrically coupled to the RF source 221 and configured to distribute the signal generated by the input waveform generator into a first line 223 for transmitting a radar signal component having a first type of polarization and into a second line 224 for transmitting a radar signal component having a second type of polarization. The first line 223 is coupled to the first multi-mode antenna feed (not shown) of the antenna element 21 for transmitting the first signal component having the first type of polarization. Likewise, the second line 224 is coupled to the second multi-mode antenna feed (not shown) for transmitting the second signal component having the second type of polarization.

According to one embodiment of the present invention, the power distributing element 222 includes a radio frequency power one-to-two divider (not shown) configured for splitting the signal generated by the radio frequency source simultaneously into a first signal component relayed to the first line 223 and a second signal component relayed to the second line 224. In this case, the transceiver elements 12 are operative to transmit a dual-polarization radar signal having simultaneously transmitting signal components with two types of polarization.

According to another embodiment of the present invention, the power distributing element 222 includes a radio frequency power switch (not shown) configured to selectively couple the radar signal generated by the radio frequency source to the first line 223 in a switch first position and to the second line 224 in a switch second position. In this case, the transceiver elements 12 are operative to transmit a radar signal component having a single type of polarization.

The transmitting portion 22 further includes a first transmitter (TR) phase shifter 225a and a second transmitter phase shifter 225b arranged, correspondingly, in the first and second lines 223 and 224 downstream of the power distributing element 222. The first and second transmitter phase shifters 225a and 225b are adapted to provide required phase shifts to the first and second transmitting signal components of the first and second polarizations, correspondingly.

According to an embodiment, the transmitting portion 22 further includes a first transmitter amplifier/attenuator 226a and a second transmitter amplifier/attenuator 226b coupled to the first and second transmitter phase shifters 225a and 225b, correspondingly. The first and second transmitter amplifier/attenuators 226a and 226b are configured to provide desired tapering (i.e., amplification/attenuation) to the first and second transmitting signal components of the first and second polarizations, correspondingly. Although in the embodiment shown in FIG. 2, the first transmitter amplifier/attenuator 226a and the second transmitter amplifier/attenuator 226b are arranged downstream of the first and second transmitter phase shifters 225a and 225b, when desired the first and second transmitter amplifier/attenuators can be arranged upstream of the first and second transmitter phase shifters 225a and 225b.

According to one embodiment of the present invention, the transceiver element 12 includes a first duplexer 227a and second duplexer 227b arranged downstream of the first and second phase shifters 225a and 225b, correspondingly. The first duplexer 227a and second duplexer 227b isolate the transmitting portion 22 from the receiving portion 23, while permitting them to share a common antenna element 21. For example, the first duplexer 227a and second duplexer 227b can be implemented as switches. Alternatively, the first duplexer 227a and second duplexer 227b can be implemented as circulators.

The first and second duplexers 227a and 227b are configured in transmitting mode, to provide shifted transmitting signal components transferred in the first and second transmitting lines 223 and 224 to the first and second multi-mode antenna feeds for transmitting the first and second transmitting signal components having first and second types of polarization, correspondingly.

In receiving mode, the first and second duplexers 227a and 227b are configured to receive the first and second receiving signal components of a received dual-polarization radar signal and provide these receiving signal components to a receiving line 231 of the receiving portion 23

The receiving portion 23 of the transceiver element 12 includes a selecting switch 232 arranged in the receiving line 231 and is coupled to the first and a second duplexers 227a and 227b. The selecting switch 232 is configured for switching between receiving the first receiving signal component provided by the antenna element 21 and having the first type of polarization and the second receiving signal component provided by the antenna element 21 and having the second type of polarization.

The receiving portion 23 of the transceiver element 12 further includes a receiver (RX) phase shifter 233 coupled to the selecting switch 232. The receiver phase shifter 233 is configured to receive the first receiving signal component having the first type of polarization from the selecting switch when the selecting switch being in a first position and to receive the second receiving signal component having the second type of polarization when the selecting switch being in a second position. In operation, the receiver phase shifter provides a required phase shift to the receiving signal component transferred through the receiver phase shifter and generates a shifted receiving signal component of a single type of polarization.

The transceiver elements 12 form a plurality of the receiving channels. Each receiver channel may include a receiver amplifier/attenuator 243, an analog-to-digital converter (ADC) 245 and other conventional elements arranged in the receiving line 231 and utilized in a receiving portion of radar systems. Although in the embodiment shown in FIG. 2, the receiver amplifier/attenuator 243 is arranged downstream of the receiver phase shifter 233, when desired the RX amplifier/attenuator 243 can be arranged upstream of the RX phase shifter 233.

The polarimetric phase array radar system (10 in FIG. 1) includes a signal processor system (not shown) arranged downstream of the receiving channels and coupled to the ADC 245. The signal processor system is configured for processing radar receiving signal components having different polarization and generating the target parameters.

Figure 3A:
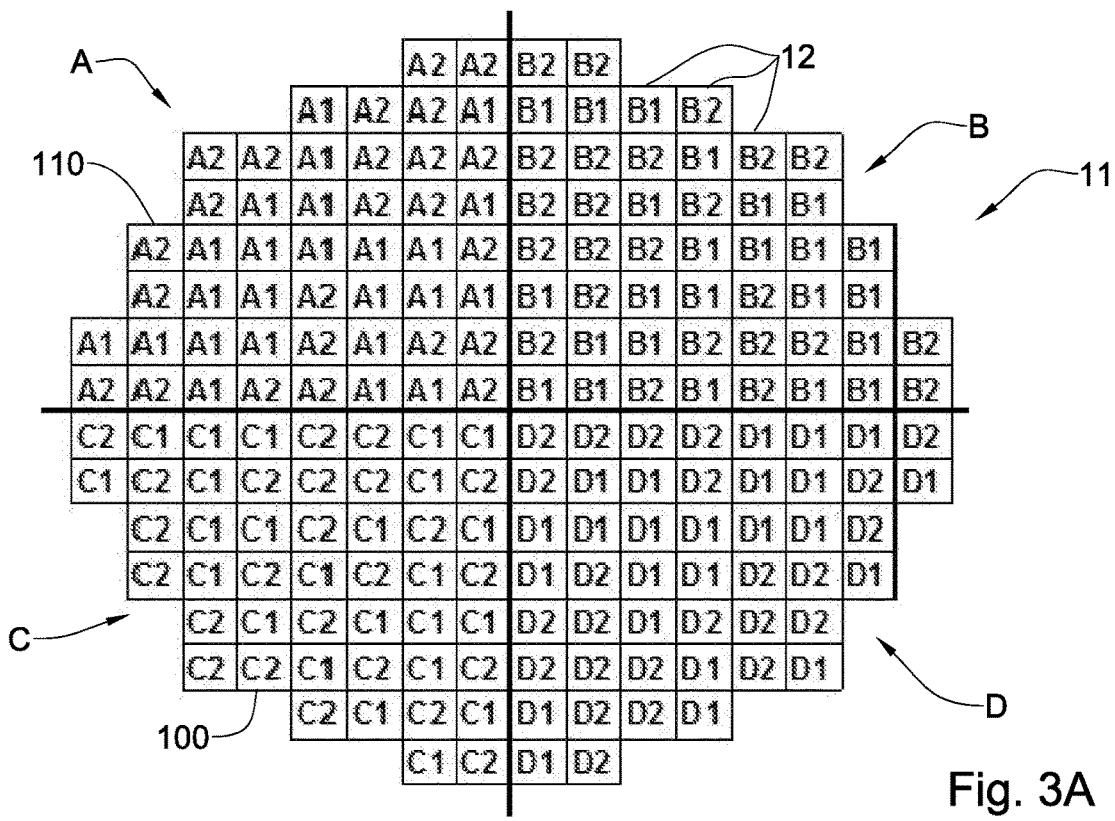
FIGS. 3A and 3B schematically illustrate examples of arrangement of the antenna elements of the transceiver elements in the array of the polarimetric phase array radar system shown in FIG. 1 that utilizes the monopulse method for calculation of target parameters.

According to one embodiment of the present invention, in the receiving mode of operation, to be able to track a target with the polarimetric phase array radar system (10 in FIG. 1), use is made of the monopulse principle. FIG. 3A schematically illustrates one example of an arrangement of distribution of the transceiver elements 12 in the array 11 of the polarimetric phase array radar system shown in FIG. 1 that utilizes the monopulse method for calculation of target parameters. To implement the monopulse principle, the array 11 of the transceiver elements 12 is divided into four sub-arrays 110. The four sub-arrays 110 are arranged in four quadrant parts of the array 11 selected from an upper left quadrant part A, an upper right quadrant part B, a lower left quadrant part C and a lower right quadrant part D of the array, correspondingly.

Each sub-array 110 comprises a first portion of the transceiver elements and a second portion of the transceiver elements. As will be described hereinbelow, the transceiver elements of the first and second portions operate with the first type and second type of polarization, correspondingly. The transceiver elements of the first and second portions that belong to the sub-array 110 located at the lower right quadrant part A are indicated by reference symbols A1 and A2, correspondingly. Likewise, the transceiver elements of the first and second portions that belong to the lower right quadrant part B are indicated by reference symbols B1 and B2, the transceiver elements of the first and second portions that belong to the lower right quadrant part C are indicated by reference symbols C1 and C2, and the transceiver elements of the first and second portions that belong to the lower right quadrant part D are indicated by reference symbols D1 and D2, correspondingly.

According to the embodiment, for one or more quadrant parts A, B, C and/or D, the transceiver elements of the first portion and the transceiver elements of the second portion of each sub-array can be interleaved with each other.

According to an embodiment, for each sub-array 110, the transceiver elements of the first and second portions should have phase centers located in the corresponding quadrant parts A, B, C and D, correspondingly. In particular, the transceiver elements A1 and A2 should have phase centers located in the corresponding quadrant part A, the transceiver elements B1 and B2 should have phase centers located in the corresponding quadrant part B, the transceiver elements C1 and C2 should have phase centers located in the corresponding quadrant part C, and the transceiver elements D1 and D2 should have phase centers located in the corresponding quadrant part D, correspondingly.

Figure 3B:
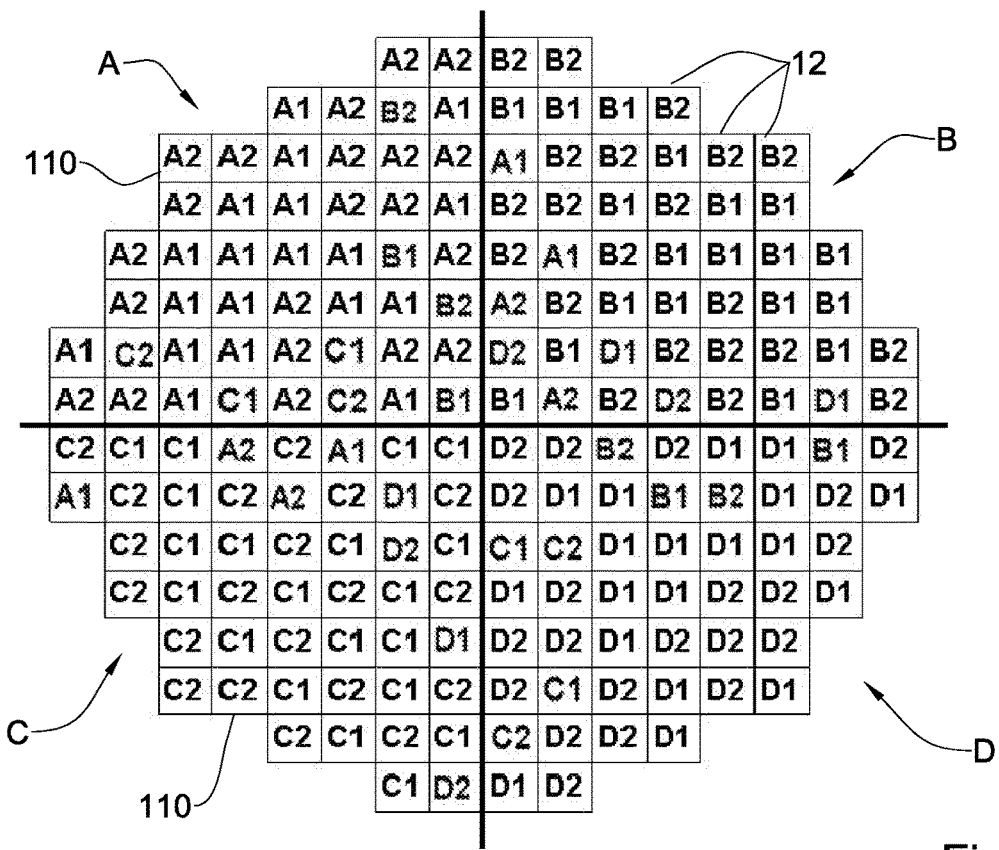

As shown in FIG. 3A, for each sub-array 110, all the transceiver elements in the first and second portions are located in the corresponding quadrant parts A, B, C and D of the array. However, when desired, for each sub-array only a majority of the transceiver elements of the first and/or second portions may be located in one quadrant part of the array, whilst a minority of the transceiver elements of the first and/or second portions may be located in neighboring quadrant parts of the array, provided that the phase centers of the transceiver elements of the first and second portions are nevertheless located in the corresponding quadrant parts. As shown in FIG. 3B, only a majority of the transceiver elements of the first and second portions is located in the corresponding quadrant part of the array, whilst a minority of the transceiver elements of the first and second portions is located in neighboring quadrant parts. In particular, a majority of the transceiver elements A1 and A2 of the first and second portions are located in the quadrant part A, while a few elements A1 and A2 are yet located in the quadrant parts A and C of the array.

Nevertheless, the phase centers of the transceiver elements A1 and A2 of the first and second portions should be located in the quadrant part A. Likewise, for the other quadrant parts B, C and D of the array the phase centers of the transceiver elements of the first and second portions should be located in the corresponding quadrant parts.

In receiving mode of operation, each sub-array 110 is configured to receive a radar signal component having a first type polarization by the first portion of the transceiver elements; and to receive a radar signal component having a second type polarization by the second portion of the transceiver elements. The first portion of the transceiver elements has a first predetermined spatial dynamic distribution, while the second portion of the transceiver elements has a second predetermined spatial dynamic distribution.

According to an embodiment of the present invention, in order to provide an optimal performance of the polarimetric phase array radar system (such as an accurate beam deflection angle, low side lobes, low active return loss, low cross polarization, etc.), an optimization of the first and second predetermined spatial dynamic distributions of the transceiver elements in the first and second portions depends on one or more system parameters. For example, the first and second predetermined spatial dynamic distributions are different for different operating frequencies. The distributions are different for different numbers of the transceiver elements in the array, and also depend on the coupling between the antenna elements, etc. Moreover, the first and second predetermined spatial dynamic distributions can be different for different boresight (beam deflection) angles and for different target parameters, such as a target range, a target elevation angle, a target azimuth angle.

The optimal distributions of the transceiver elements in the first and second portions for operation at a particular frequency and for a certain target parameter can be determined by using standard optimization methods. Examples of the optimization methods include, but are not limited to, the Genetic Algorithm, Newton's method, Quasi-Newton method, Monte Carlo method, etc. These methods are known per se and therefore are not expounded here below.

Various approaches can be used when calculating the optimal distributions of the transceiver elements in the first and second portions. For example, the optimal distributions of the transceiver elements in the first and second portions can be calculated for each desired target elevation angle and target azimuth angle at a desired operation frequency. According to another example, the total range of the target elevation and target azimuth angles can be divided into several sub-ranges. Thus, for each sub-range of target elevation and target azimuth angles the optimal distributions of the transceiver elements in the first and second portions can be calculated at a desired frequency.

According to one embodiment of the present invention, calculation of the optimal distributions of the transceiver elements in the first and second portions is carried out in the signal processor system of the polarimetric phase array radar system of the present invention "on the fly", i.e., during operation of the system for tracking the target and determination of target parameters.

According to another embodiment of the present invention, calculation of the optimal distributions of the transceiver elements in the first and second portions is carried out in advance, for example, in the form of look-up tables. Thus, the look-up-tables can be stored in a memory of the signal processor system and used during operation of the system for tracking the target and determination of target parameters.

According to an embodiment of the present invention, calculated distributions of the transceiver elements in the first and second portions can be used for optimization of other elements of the polarimetric phase array radar system of the present invention. For example, the optimal distributions of the transceiver elements in the first and second portions can be used for optimal operation of the amplifier/attenuator(s) (243 in FIG. 2) of the transceiver elements 12 to provide desired tapering of power of the receiving signal components of the dual-polarization radar signal received on apertures of the antenna elements 21. The tapering of a power of the signal components of the radar signal can, for example, be required for reducing a level of the side lobs to a desired magnitude.

The tapering of a power of the signal components can be different for different distributions of the transceiver elements. According to an embodiment of the present invention, the optimal amplification or attenuation of magnitudes of the signal components can be determined "on the fly" during operation of the system for tracking the target. According to another embodiment, the optimal amplification or attenuation of magnitudes of the signal components are calculated in advance. These magnitudes can be stored in the form of look-up tables and utilized during operation of the system for tracking the target.

The described scheme of dividing the array 11 of the transceiver elements 12 into sub-arrays 110 employs the monopulse tracking technique for calculating the target parameters. The monopulse technique uses the four quadrants A, B, C and D of the array 11. The elements are all steered together using the phase shifters (233 in FIG. 2). The target is illuminated by all transceiver elements 12 of the four quadrants equally. The signal processor system of the polarimetric phase array radar system can be used to process return signal components of the first type polarization and the second type of polarization received by the four quadrants. For example, two types of polarization can be horizontal polarization and vertical polarization. Likewise, the two types of polarization can be left-handed circular polarization and right handed circular polarization.

The processing includes summing the signal components having one or two types of polarization received from the four sub-arrays to calculate four sub-array sum signals for one type or two types of polarization.

For the first type of polarization the sum signal $\Sigma_1$ is obtained by $$\Sigma_1 = A_1 + B_1 + C_1 + D_1,$$

where $A_1$, $B_1$, $C_1$ and $D_1$ are the signal components having the first type of polarization received from the four sub-arrays A, B, C and D.

For the second type of polarization the sum signal E2 is obtained by $$\Sigma_2 = A_2 \pm B_2 \pm C_2 \pm D_2$$

where $A_2$, $B_2$, $C_2$ and $D_2$ are the signal components having the second type of polarization received from the four sub-arrays A, B, C and D.

In accordance with the monopulse method, the sum signals $\Sigma_1$ and $\Sigma_2$ can, for example, be used to track target distance.

The elevation difference signals for each type of polarization are formed by subtracting the signal components having one or two types of polarization that are received from the two upper quadrants from the signal components having two types of polarization that are received from the two lower quadrants.

For the first type of polarization the elevation difference signal $\Delta el_1$ is obtained by $$\Delta el_1 = (A_1 + B_1) - (C_1 + D_1)$$

For the second type of polarization the elevation difference signal $\Delta el_2$ is obtained by $$\Delta el_2 = (A_2 + B_2) - (C_2 + D_2)$$

The elevation difference signals for each type of polarization can be processed for calculation of the target's position relative to the horizon, since the target elevation angle is proportional to monopulse ratios $\Delta el_1/\Sigma_1$ and $\Delta el_2/\Sigma_2$. When desired, a weighted combination of $\Delta el_1$, $\Delta el_2$, $\Sigma_1$ and $\Sigma_2$ can be used for calculating the target's position relative to the horizon. An example of the combination includes, but is not limited to, the combination $(\alpha \Delta el_1 + \beta el_2)/(\gamma \Sigma_1 + \delta \Sigma_2)$, where $\alpha$, $\beta$, $\gamma$ and $\delta$ are the corresponding weights.

The azimuth difference signals for each type of polarization are formed by subtracting the signal components having one or two types of polarization that are received from the left quadrants from the signal components having two types of polarization that are received from the right quadrants.

For the first type of polarization the azimuth difference signal $\Delta az_1$ is obtained by $$\Delta az_1 = (A_1 + D_1) - (B_1 + C_1)$$

For the second type of polarization the elevation difference signal $\Delta az_2$ is obtained by $$\Delta az_2 = (A_2 + D_2) - (B_2 + C_2)$$

The azimuth difference signals for each type of polarization can be processed to calculate the target's position to the left or right, since the target azimuth angle is proportional to monopulse ratios $\Delta az_1/\Sigma_1$ and $\Delta az_2/\Sigma_2$. When desired, a weighted combination of $\Delta az_1$, $\Delta az_2$, and $\Sigma_1$, $\Sigma_2$ can be used for calculating the target's position to the left or right. An example of the combination includes, but is not limited to, the combination $(\alpha \Delta az_1 + (\beta az_2)/(\gamma \Sigma_1 + \delta \Sigma_2)$, where $\alpha$, $\beta$, $\gamma$ and $\delta$ are the corresponding weights.

Figure 4A:
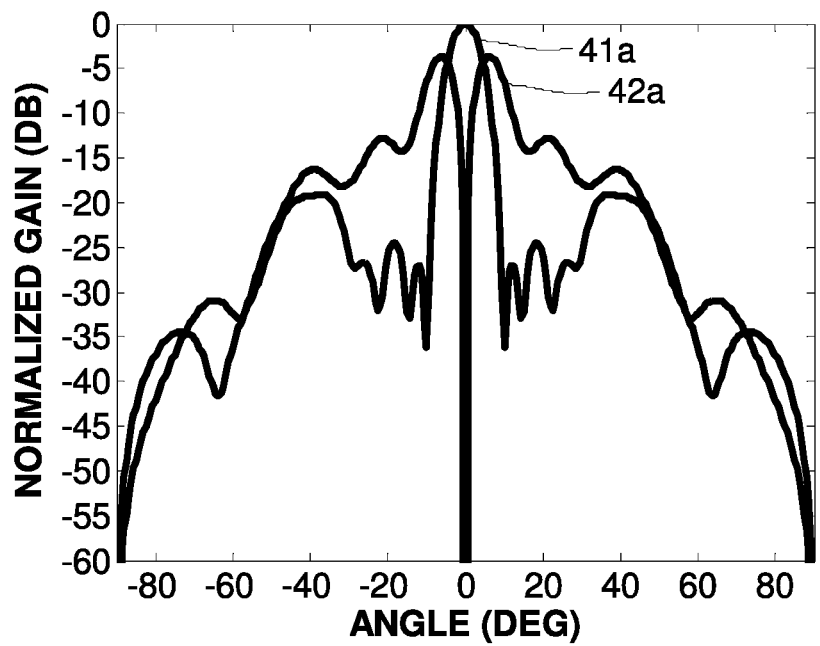
FIGS. 4A and 4B illustrate an example of simulations of the sum signal pattern and azimuth difference signal pattern in azimuth plane versus azimuth angle of a target when the boresight angle is 0 degrees and the distribution of the transceiver elements corresponds to the distribution shown in FIG. 3A.
Figure 4B:
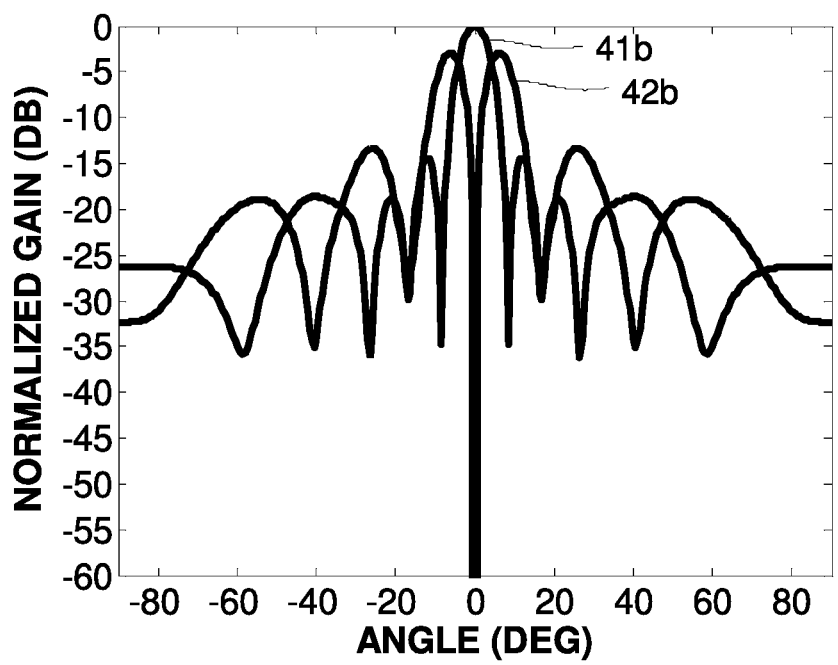

Examples of the results of simulations of the sum signal pattern (normalized to the maximum gain value) (curves 41*a* and 41*b*) and azimuth difference signal pattern (normalized to the maximum gain value) (curves 42*a* and 42*b*) in azimuth plane versus azimuth angle of a target are shown in FIGS. 4A and 4B for the vertical polarization signal (curves 41*a* and 42*a*) and horizontal polarization signal (curves 41*b* and 42*b*). The simulations were carried out for the boresight angle of 0 degrees and for a circular array having a diameter of 8.3$\lambda$, where $\lambda$ is the operating wavelength. FIGS. 4A and 4B correspond to the case when the distribution of the transceiver elements corresponds to the distribution shown in FIG. 3A, i.e. when all the transceiver elements of the first and second portions are located in the corresponding quadrant parts A, B, C and D of the array.

Figure 5A:
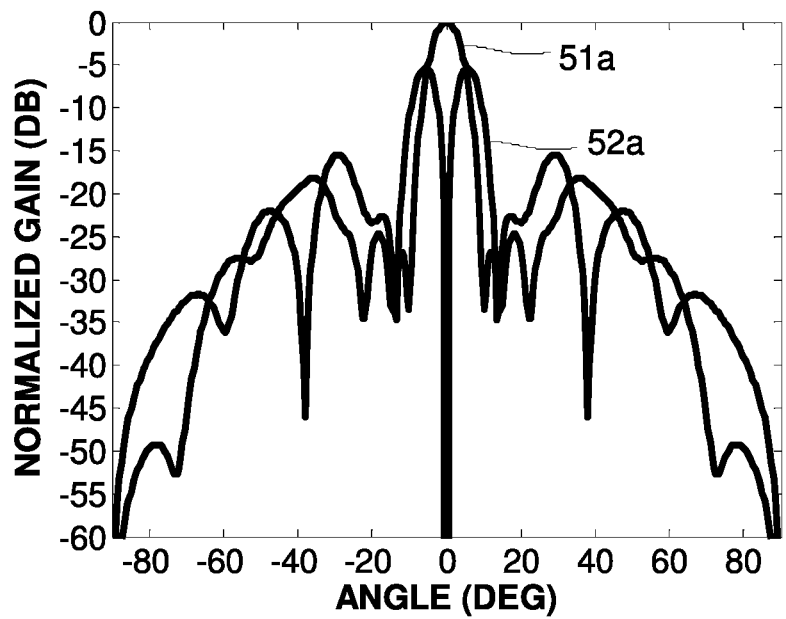
FIGS. 5A and 5B illustrate an example of simulations of the sum signal pattern and azimuth difference signal pattern in azimuth plane versus azimuth angle of a target when the boresight angle is 0 degrees and the distribution of the transceiver elements corresponds to the distribution shown in FIG. 3B.
Figure 5B:
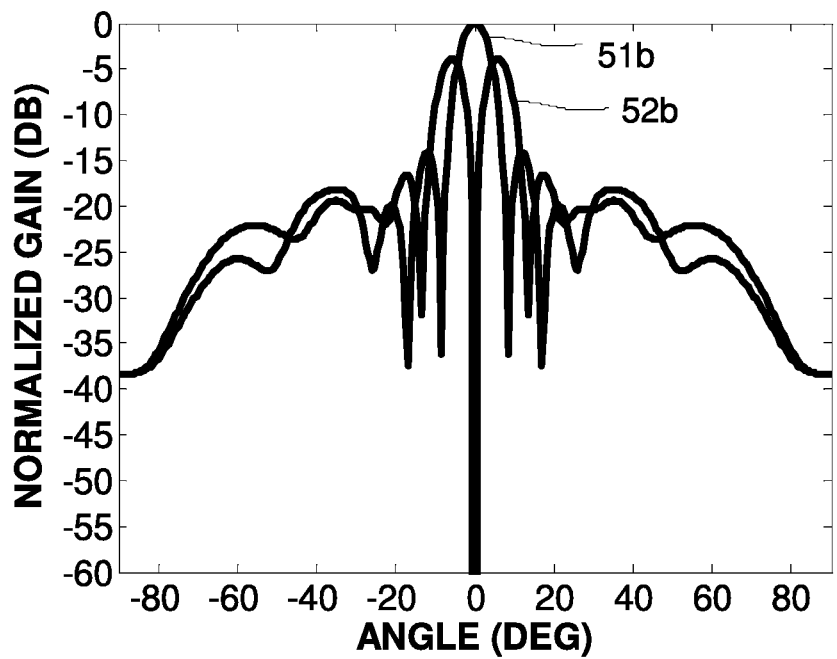

Simulations were carried out also for the case when only a majority of the transceiver elements of the first and second portions is located in the corresponding quadrant part of the array, whilst a minority of the transceiver elements of the first and second portions is located in neighboring quadrant parts of the array. FIGS. 5A and 5B illustrate an example of simulations of the sum signal pattern (normalized to the maximum gain value) (curves 51a and 51b) and azimuth difference signal pattern (normalized to the maximum gain value) (curves 52a and 52b) in azimuth plane versus azimuth angle of a target when the distribution of the transceiver elements corresponds to the distribution shown in FIG. 3B.

Figure 6:
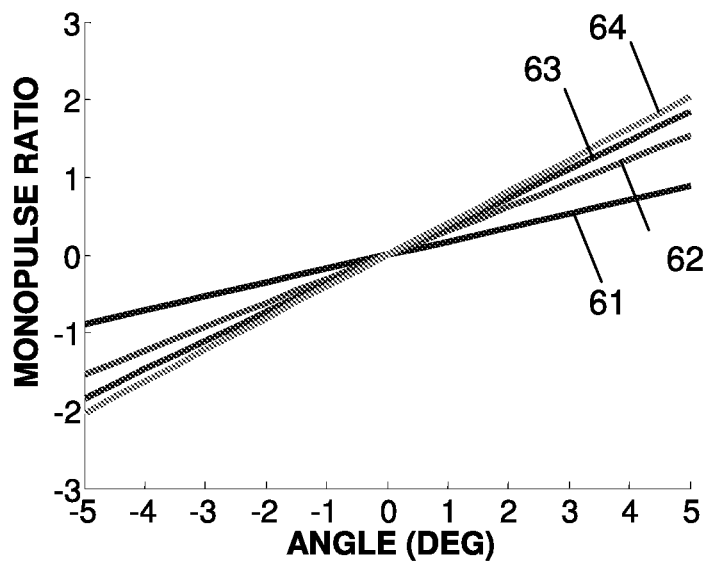
FIG. 6 illustrates dependencies of the monopulse ratio versus azimuth angle obtained for the transceiver elements of the first and second portions of the array that receive signals having vertical and horizontal polarizations, when the boresight angle is 0 degrees and for the distribution of the transceiver elements corresponds to the distribution shown in FIGS. 3A and 3B.

The values of the sum signals and azimuth difference signals can be used for calculation of the azimuth angle. FIG. 6 illustrates dependencies of the monopulse ratio versus azimuth angle obtained for the transceiver elements of the first and second portions of the array that receive the signals having the vertical polarization (curves 61 and 63) and the horizontal polarization (curves 62 and 64). Curves 61 and 62 correspond to the the distribution of the transceiver elements shown in FIG. 3A, while Curves 63 and 64 correspond to the the distribution of the transceiver elements shown in FIG. 3B.

Figure 7A:
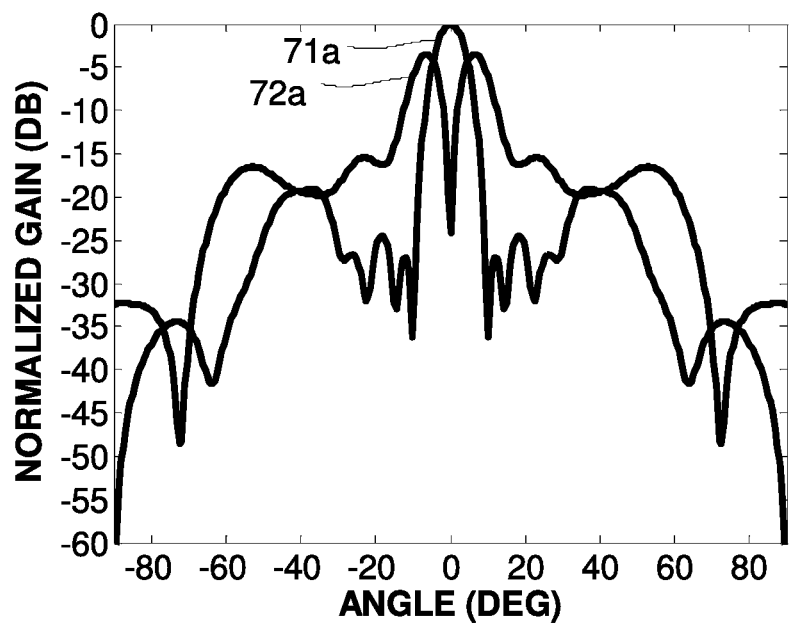
FIGS. 7A and 7B illustrate an example of simulations of the sum signal pattern and elevation difference signal pattern in elevation plane versus elevation angle of a target when the boresight angle is 0 degrees and the distribution of the transceiver elements corresponds to the distribution shown in FIG. 3A.
Figure 7B:
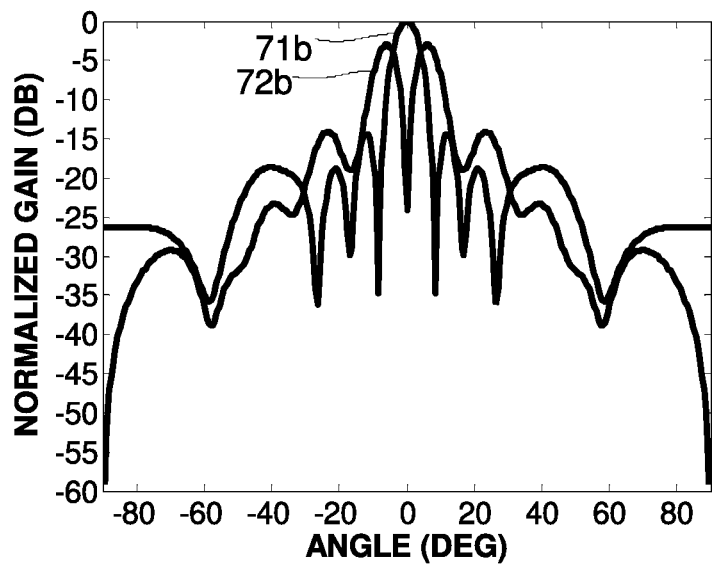

Examples of the results of simulations of the sum signal pattern (normalized to the maximum gain value) (curves 71a and 71b) and elevation difference signal pattern (normalized to the maximum gain value) (curves 72a and 72b) in elevation plane versus elevation angle of a target are shown in FIGS. 7A and 7B for the vertical polarization signal (curves 71a and 72a) and horizontal polarization signal (curves 71b and 72b). The simulations were carried out for the boresight angle of 0 degrees and for a circular array having a diameter of 8.3λ, where λ is the operating wavelength. FIGS. 7A and 7B correspond to the case when the distribution of the transceiver elements corresponds to the distribution shown in FIG. 3A, i.e. when all the transceiver elements of the first and second portions are located in the corresponding quadrant parts A, B, C and D of the array.

Figure 8:
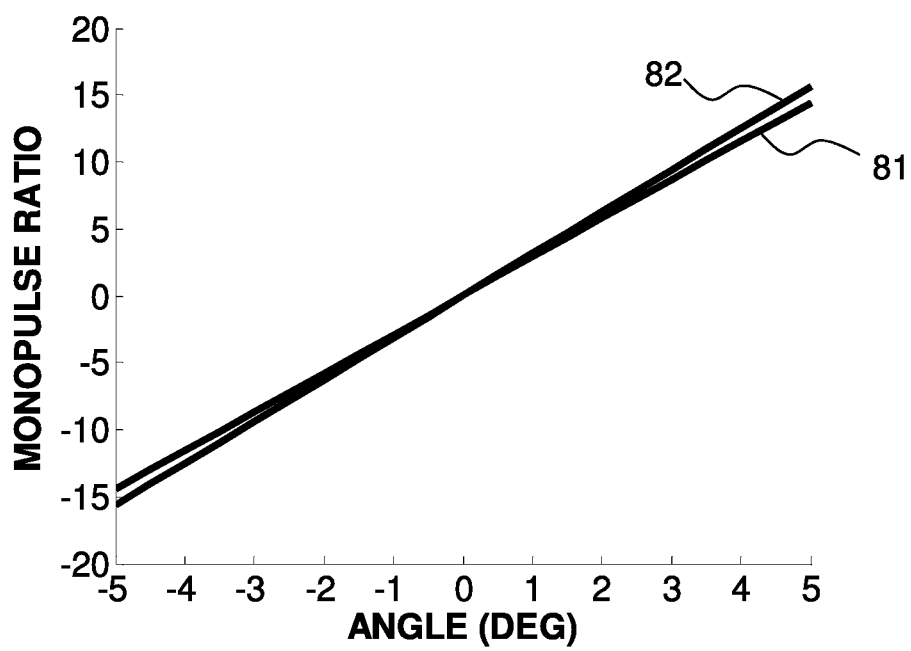
FIG. 8 illustrates dependencies of the monopulse ratio versus elevation angle obtained for the transceiver elements of the array that receive the signals having vertical polarization and horizontal polarization when the boresight angle is 0 degrees and the distribution of the transceiver elements corresponds to the distribution shown in FIG. 3A.

The values of the sum signals and elevation difference signals can be used for calculation of the elevation angle. FIG. 8 illustrates dependencies of the monopulse ratio versus elevation angle obtained for the transceiver elements of the first and second portions of the array that receive signals having vertical polarization (curve 81) and horizontal polarization (curve 82).

The technique of the present invention can be used for determination of the target parameters when scanning at various boresight angles.

Figure 9A:
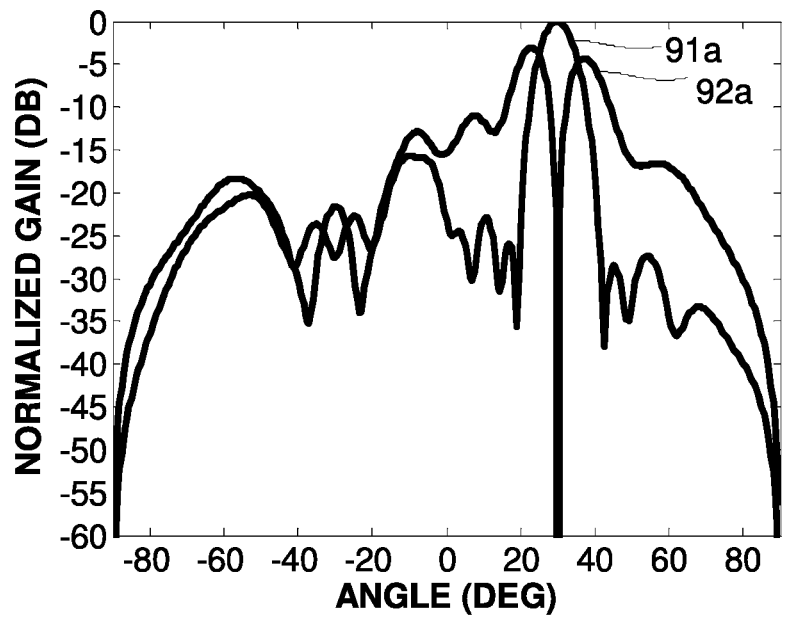
FIGS. 9A and 9B illustrate an example of simulations of the sum signal pattern and azimuth difference signal pattern in azimuth plane versus azimuth angle of a target when the boresight angle is 30 degrees and the distribution of the transceiver elements corresponds to the distribution shown in FIG. 3A.
Figure 9B:
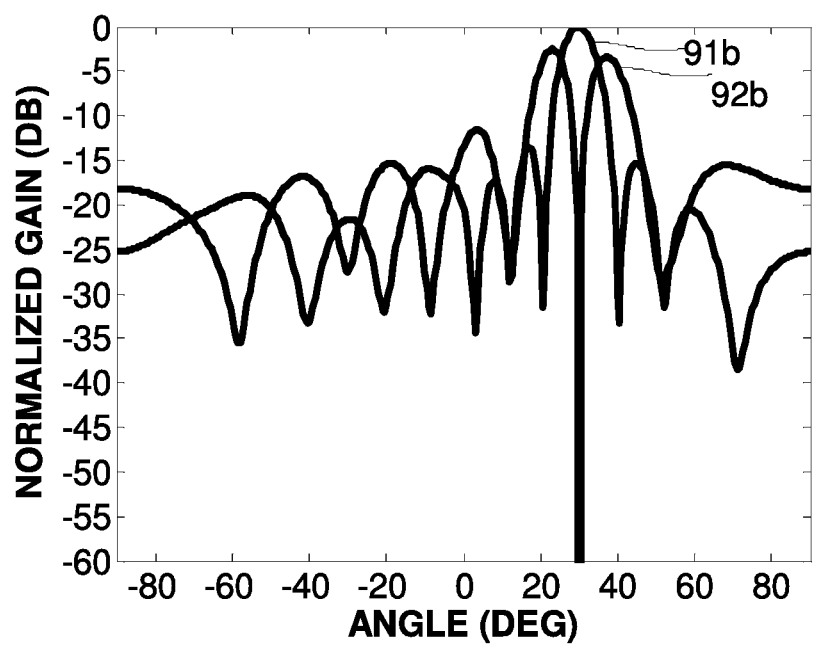

Examples of the results of simulations of the sum signal pattern (normalized to the maximum gain value) (curves 91a and 91b) and azimuth difference signal pattern (normalized to the maximum gain value) (curves 92a and 92b) in azimuth plane versus azimuth angle of a target are shown in FIGS. 9A and 9B for the vertical polarization signal (curves 91a and 92a) and horizontal polarization signal (curves 91b and 92b). The simulations were carried out for the boresight angle of 30 degrees and for a circular array having a diameter of 8.3λ, where λ is the operating wavelength. FIGS. 9A and 9B correspond to the case when the distribution of the transceiver elements corresponds to the distribution shown in FIG. 3A, i.e. when all the transceiver elements of the first and second portions are located in the corresponding quadrant parts A, B, C and D of the array.

Figure 10A:
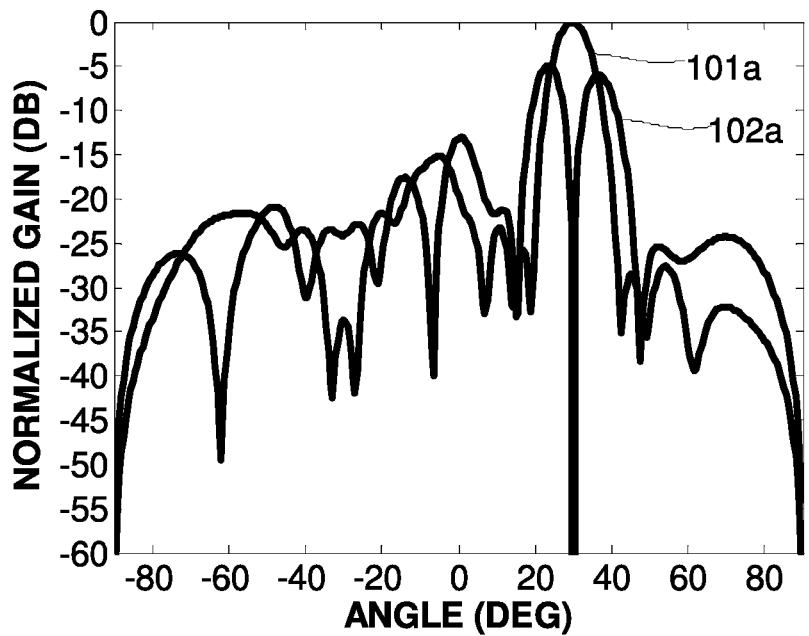
FIGS. 10A and 10B illustrate an example of simulations of the sum signal pattern and azimuth difference signal pattern in azimuth plane versus azimuth angle of a target when the boresight angle is 30 degrees and the distribution of the transceiver elements corresponds to the distribution shown in FIG. 3B.
Figure 10B:
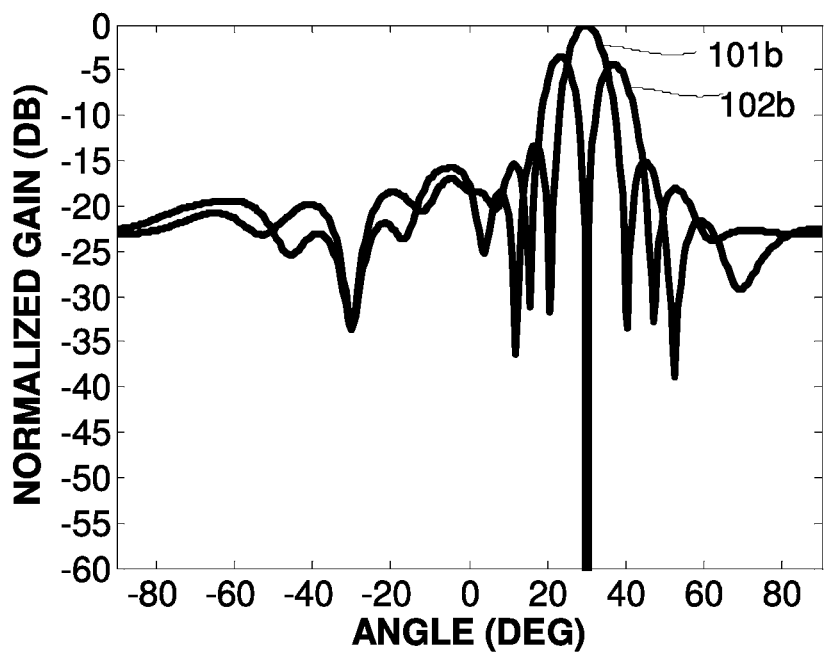

Simulations for the case of the boresight angle of 30 degrees were carried out also when only a majority of the transceiver elements of the first and second portions is located in the corresponding quadrant part of the array, whilst a minority of the transceiver elements of the first and second portions is located in neighboring quadrant parts of the array. FIGS. 10A and 10B illustrate an example of simulations of the sum signal pattern (normalized to the maximum gain value) (curves 101a and 101b) and azimuth difference signal pattern (normalized to the maximum gain value) (curves 102a and 102b) in azimuth plane versus azimuth angle of a target when the distribution of the transceiver elements corresponds to the distribution shown in FIG. 3B.

Figure 11:
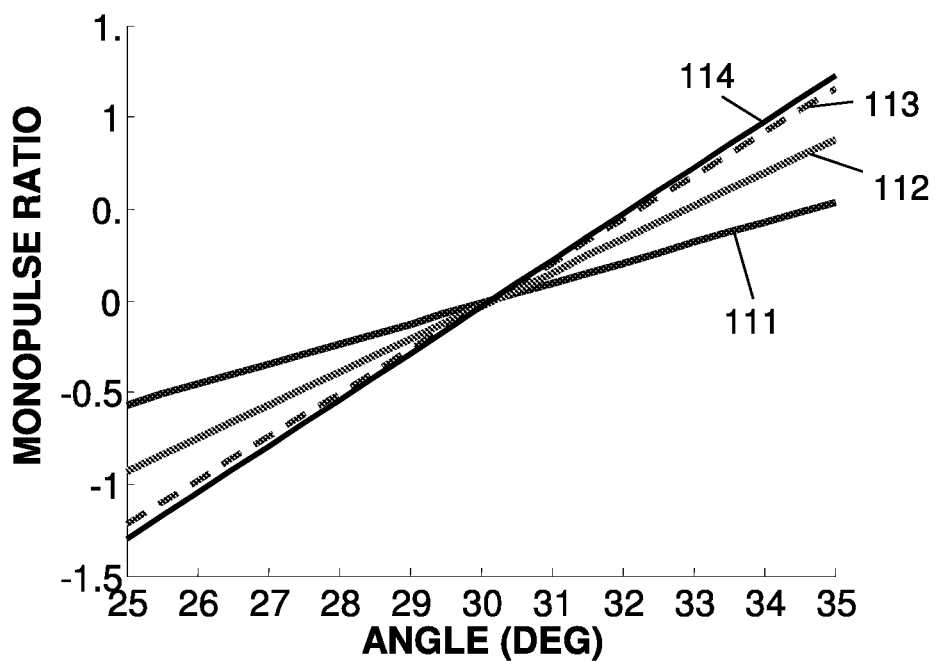
FIG. 11 illustrates dependencies of the monopulse ratio versus azimuth angle obtained for the transceiver elements of the array that receive the signals having vertical and horizontal polarizations, when the boresight angle is 30 degrees and distribution of the transceiver elements corresponds to the distribution shown in FIGS. 3A and 3B.

The values of the sum signals and azimuth difference signals for the case of the boresight angle of 30 degrees can be used for calculation of the azimuth angle. FIG. 11 illustrates dependencies of the monopulse ratio versus azimuth angle obtained for the transceiver elements of the first and second portions of the array that receive signals having vertical polarization (curves 111 and 113) and horizontal polarization (curves 112 and 114). Curves 111 and 112 correspond to the the distribution of the transceiver elements shown in FIG. 3A, while curves 113 and 114 correspond to the the distribution of the transceiver elements shown in FIG. 3B.

Figure 12A:
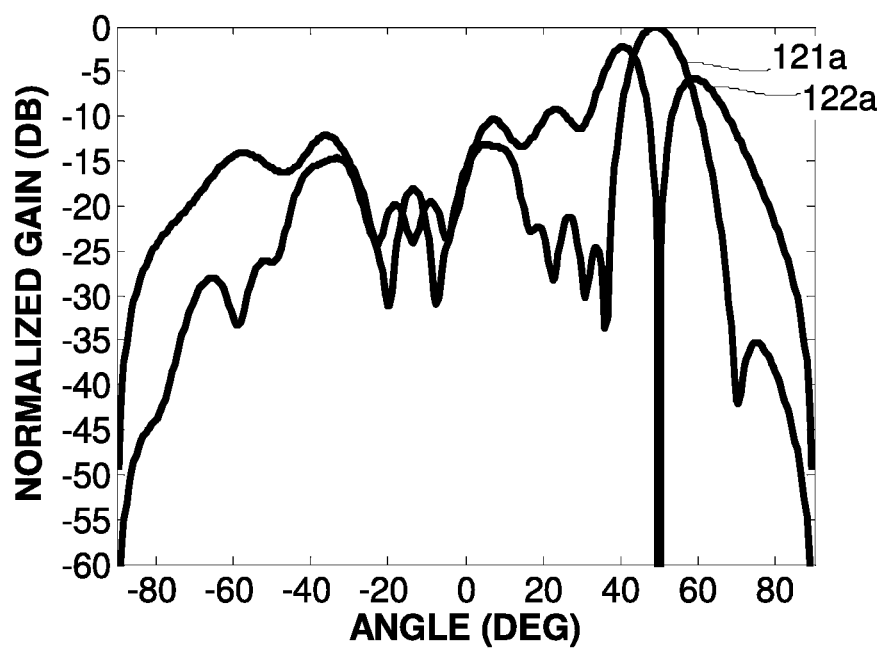
FIGS. 12A and 12B illustrate an example of simulations of the sum signal pattern and azimuth difference signal pattern in azimuth plane versus azimuth angle of a target when the boresight angle is 50 degrees and the distribution of the transceiver elements corresponds to the distribution shown in FIG. 3A.
Figure 12B:
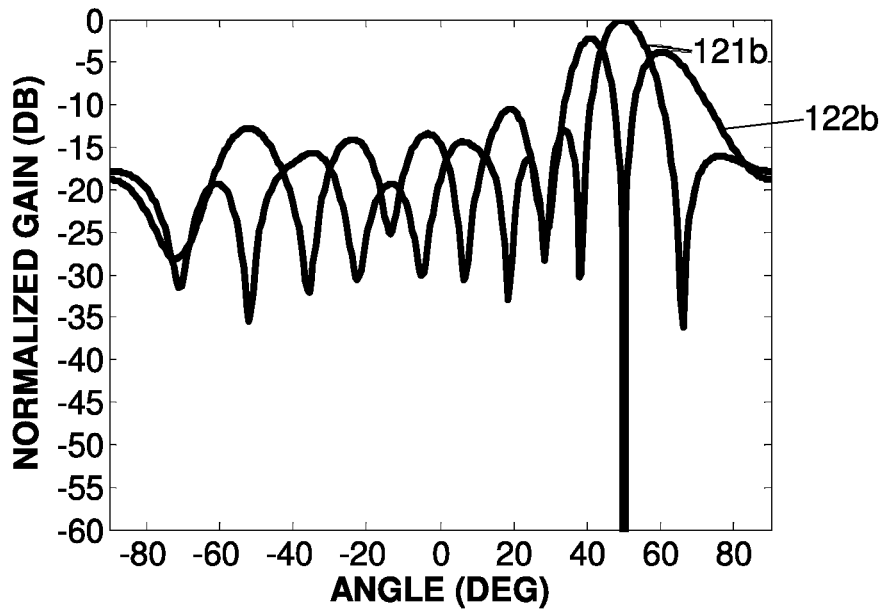

Examples of the results of simulations of the sum signal pattern (normalized to the maximum gain value) (curves 121a and 121b) and azimuth difference signal pattern (normalized to the maximum gain value) (curves 122a and 122b) in azimuth plane versus azimuth angle of a target are shown in FIGS. 12A and 12B for the vertical polarization signal (curves 121a and 122a) and horizontal polarization signal (curves 121b and 122b).

The simulations were carried out for the boresight angle of 50 degrees and for a circular array having a diameter of 8.3λ, where λ is the operating wavelength. FIGS. 12A and 12B correspond to the case when distribution of the transceiver elements corresponds to the distribution shown in FIG. 3A, i.e. when all the transceiver elements of the first and second portions are located in the corresponding quadrant parts A, B, C and D of the array.

Figure 13A:
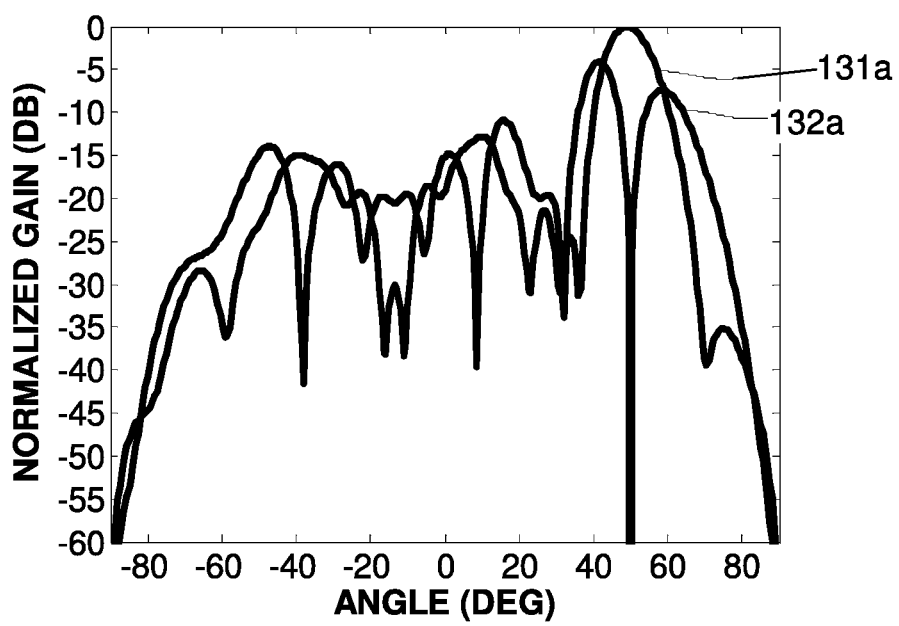
FIGS. 13A and 13B illustrate dependencies of the monopulse ratio versus azimuth angle obtained for the transceiver elements of the array that receive signals having vertical and horizontal polarizations, when the boresight angle is 50 degrees and distribution of the transceiver elements corresponds to the distribution shown in FIG. 3B.
Figure 13B:
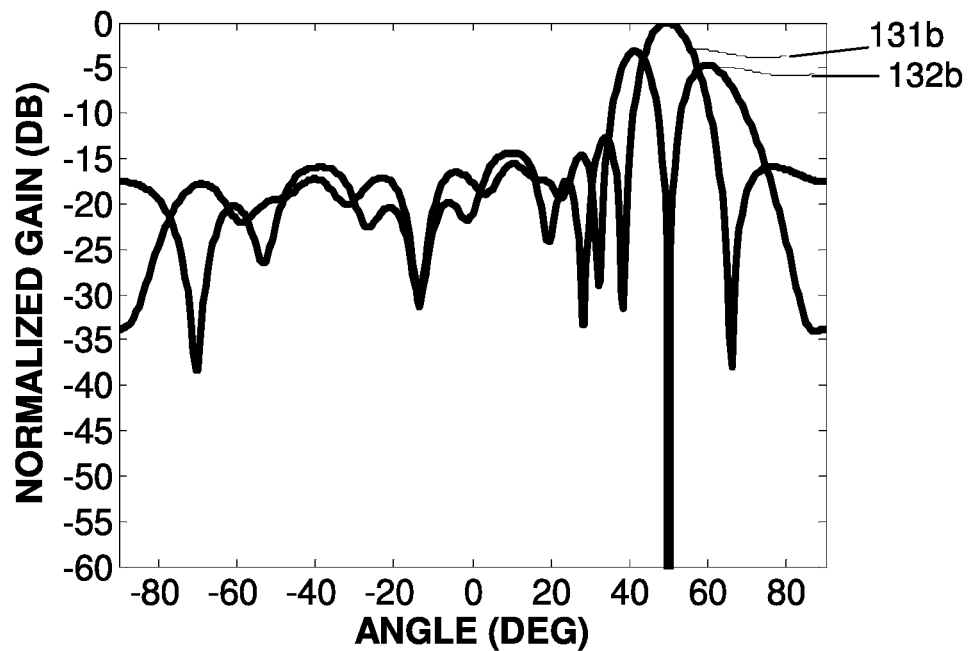

Simulations for the case of the boresight angle of 50 degrees were carried out also when only a majority of the transceiver elements of the first and second portions is located in the corresponding quadrant part of the array, whilst a minority of the transceiver elements of the first and second portions is located in neighboring quadrant parts of the array. FIGS. 13A and 13B illustrate an example of simulations of the sum signal pattern (normalized to the maximum gain value) (curves 131a and 131b) and azimuth difference signal pattern (normalized to the maximum gain value) (curves 132a and 132b) in azimuth plane versus azimuth angle of a target when the distribution of the transceiver elements corresponds to the distribution shown in FIG. 3B.

Figure 14:
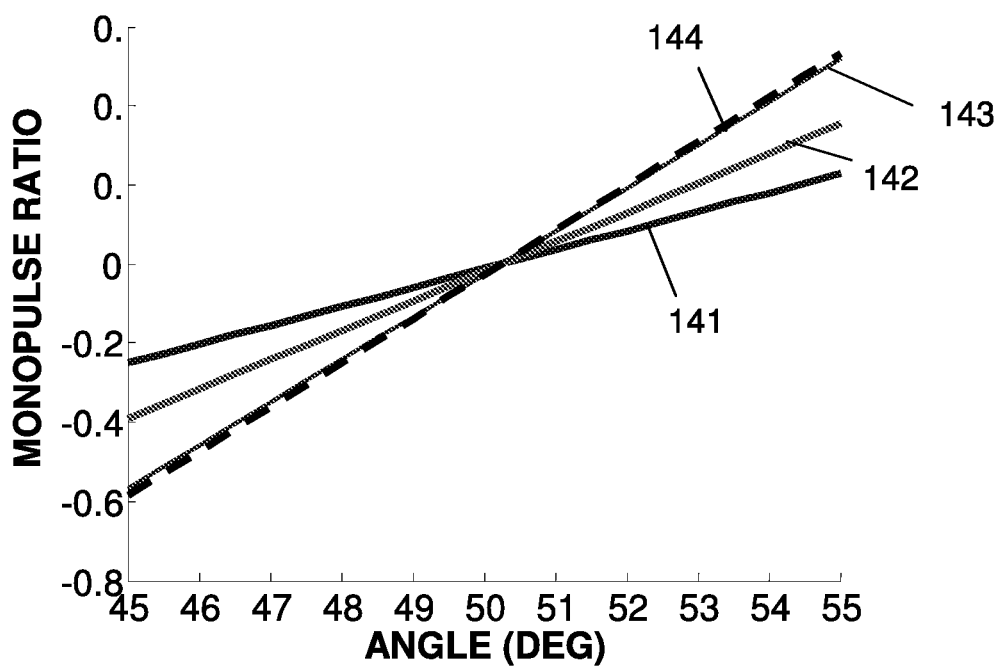
FIG. 14 illustrates dependencies of the monopulse ratio versus azimuth angle obtained for the transceiver elements of the array that receive signals having vertical polarization and horizontal polarization when the boresight angle is 50 degrees and distribution of the transceiver elements corresponds to the distribution shown in FIGS. 3A and 3B.

The values of the sum signals and azimuth difference signals for the case of the boresight angle of 50 degrees can be used for calculation of the azimuth angle. FIG. 14 illustrates dependencies of the monopulse ratio versus azimuth angle obtained for the transceiver elements of the first and second portions of the array that receive signals having vertical polarization (curves 141 and 143) and horizontal polarization (curves 142 and 144). Curves 141 and 142 correspond to the the distribution of the transceiver elements shown in FIG. 3A, while Curves 143 and 144 correspond to the the distribution of the transceiver elements shown in FIG. 3B. It should be noted that the curves 143 and 144 lie very close to each other.

Figures 15A, 15B:
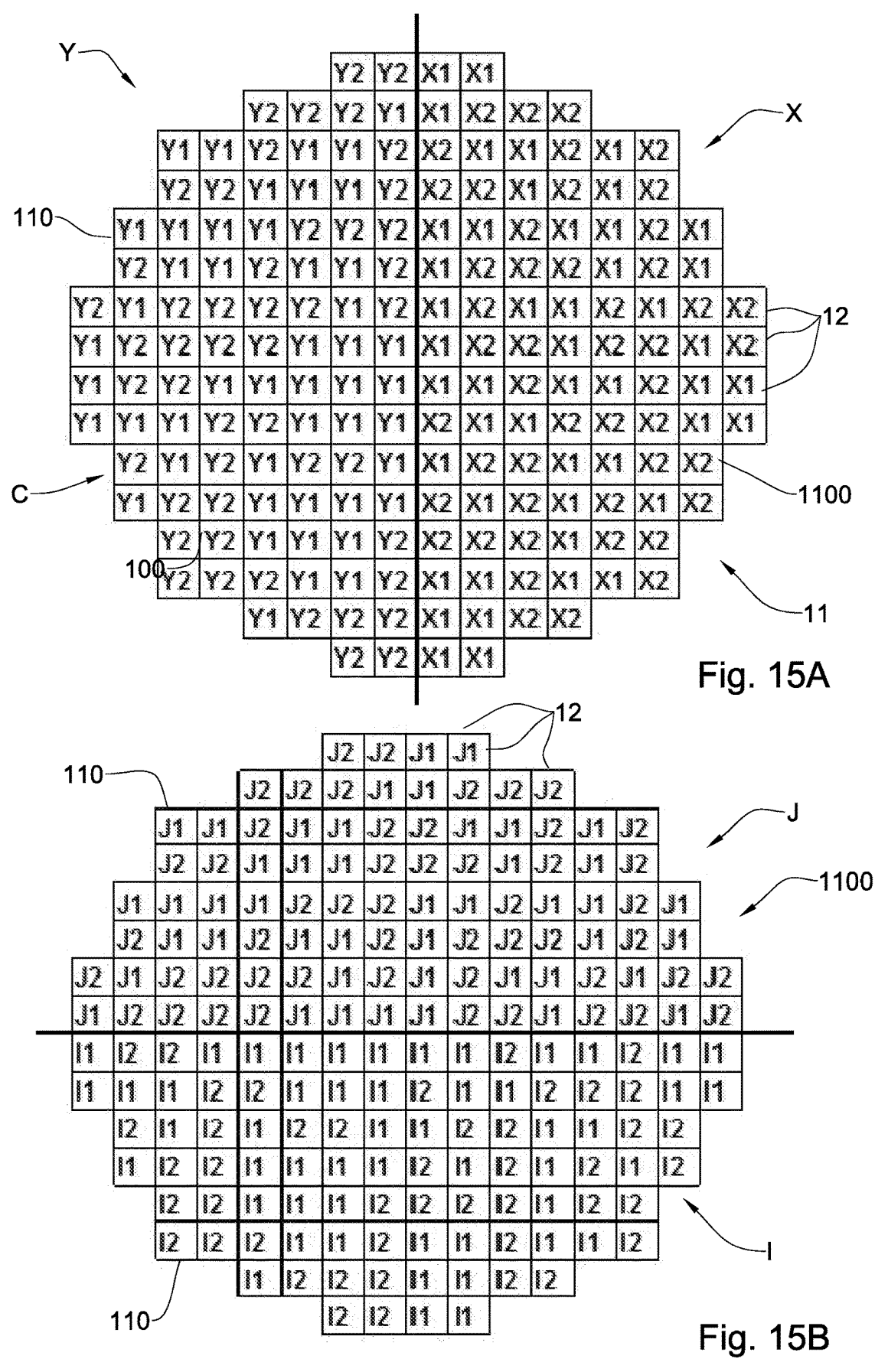

According to a further embodiment of the present invention, in receiving mode of operation, to be able to track a target with the polarimetric phase array radar system (10 in FIG. 1), use is made of the interferometric technique. FIGS. 15A and 15B schematically illustrate examples of arrangement of the antenna elements 21 of the transceiver elements 12 in the array 11 of the polarimetric phase array radar system shown in FIG. 1 that utilizes the interferometric method for calculation of target parameters. To implement the interferometric method, the array 11 of the transceiver elements 12 is divided into two sub-arrays 1100. For determination of a target azimuth and elevation angles, the two sub-arrays 1100 can be arranged in two half parts of the array 11 in two ways, correspondingly.

Specifically, for determination of a target azimuth angle, the two sub-arrays 1100 are selected from a right half part X and a left half part Y. In its turn, for determination of a target elevation angle, the two sub-arrays 1100 are selected from an upper half part I and a lower half part J of the array.

Each sub-array 1100 comprises a first portion of the transceiver elements (indicated by reference numerals X1 and J1) and a second portion of the transceiver elements (indicated by a reference numeral Y2 and I2).

According to an embodiment, for distribution of the transceiver elements shown in FIG. 15A, in each sub-array 1100, the transceiver elements X1 are interleaved with the transceiver elements X2 and the transceiver elements Y1 are interleaved with the transceiver elements Y2. Likewise, for distribution of the transceiver elements shown in FIG. 15B, in each sub-array 1100, the transceiver elements J1 are interleaved with the transceiver elements J2 and the transceiver elements I1 are interleaved with the transceiver elements I2.

According to an embodiment, for each sub-array 1100, the first and second portions of the transceiver elements have phase centers located in the corresponding half part. In particular, for the distribution of the transceiver elements shown in FIG. 15A, the phase centers of the transceiver elements X1 and X2 are located in the half part X, whilst the phase centers of the transceiver elements Y1 and Y2 are located in the half part Y. Likewise, for the distribution of the transceiver elements shown in FIG. 15B, the phase centers of the transceiver elements J1 and J2 are located in the half part J, whilst the phase centers of the transceiver elements I1 and I2 are located in the half part I.

As shown in FIGS. 15A and 15B, all the transceiver elements of the first and second portions are located in the corresponding half parts of the array. However, when desired, for each sub-array only a majority of the transceiver elements of the first and/or second portions may be located in one half part of the array, whilst a minority of the transceiver elements of the first and/or second portions may be located in the neighboring half part of the array, provided that the phase centers of the transceiver elements of the first and second portions are nevertheless located in the corresponding half parts.

Figures 16A, 16B:
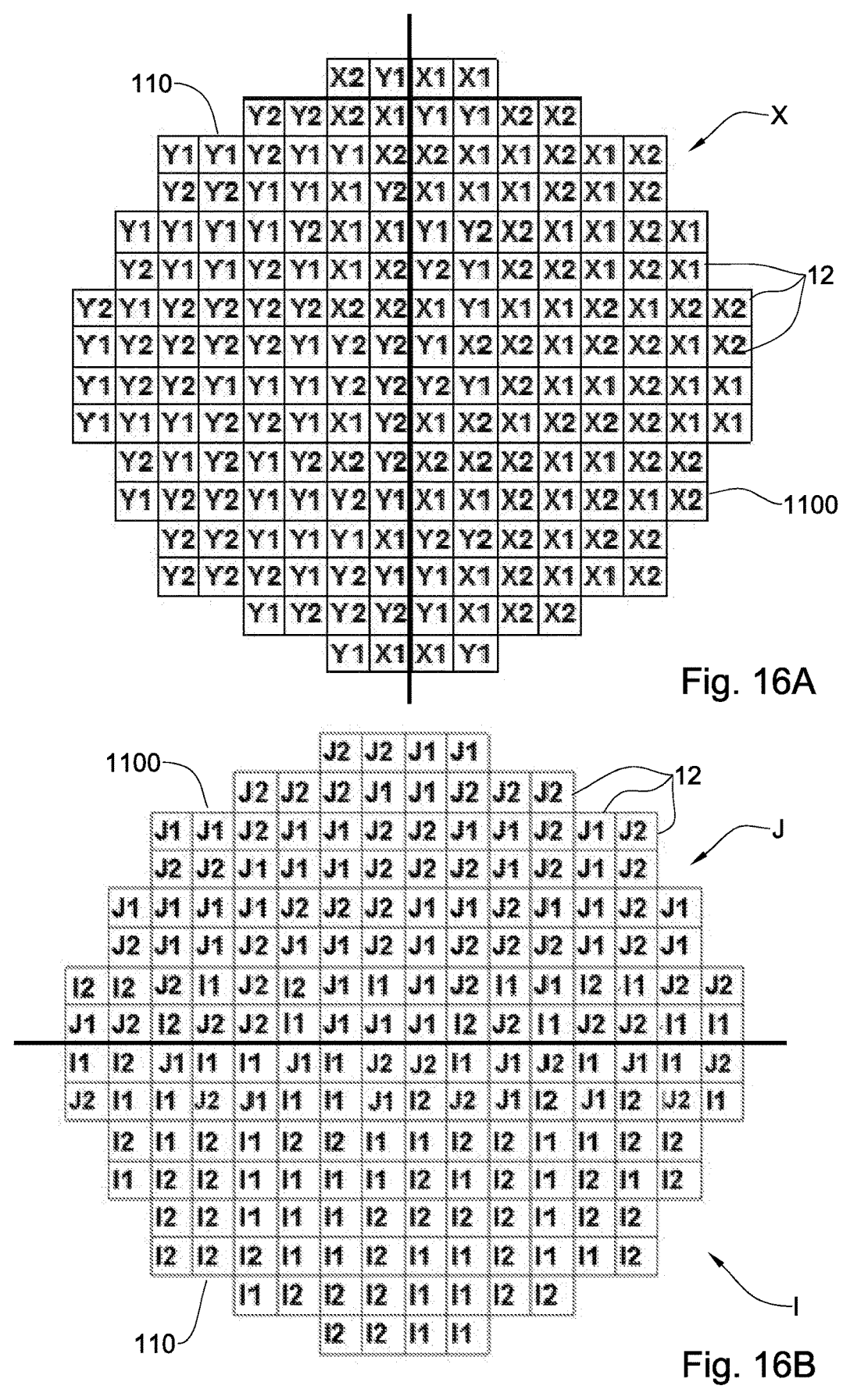

For example, as shown in FIG. 16A, only a majority of the transceiver elements X1 and X2 are located in the right half part X of the array, whilst a minority of the transceiver elements of the first and second portions are located in the neighboring half part Y of the array. Nevertheless, the phase centers of the transceiver X1 and X2 should be located in the half part X.

In receiving mode of operation, each sub-array 1100 is configured to receive a radar signal component having a first type polarization by the first portion of the transceiver elements, and to receive a radar signal component having a second type of polarization by the second portion of the transceiver elements. The first portion of the transceiver elements has a first predetermined spatial dynamic distribution, while the second portion 2 of the transceiver elements has a second predetermined spatial dynamic distribution.

According to an embodiment of the present invention, in order to provide an optimal performance of the polarimetric phase array radar system (such as an accurate beam deflection angle, low side lobes, low active return loss, low cross polarization, etc.), an optimization of the first and second predetermined spatial dynamic distributions of the transceiver elements in the first and second portions depends on one or more system parameters. For example, the first and second predetermined spatial dynamic distributions are different for different operating frequencies. The distributions are different for different numbers of the transceiver elements in the array, and also depend on the coupling between the antenna elements, etc. Moreover, the first and second predetermined spatial dynamic distributions are different for different target parameters, such as a target range, a target azimuth angle and a target elevation angle.

The optimal distributions of the transceiver elements in the first and second portions for operation at a particular frequency and for a certain target parameter can be determined by using standard optimization methods. Examples of the optimization methods include, but are not limited to, the Genetic Algorithm, Newton's method, Quasi-Newton method, Monte Carlo method, etc. These methods are known per se and therefore are not expounded herebelow.

Various approaches can be used when calculating the optimal distributions of the transceiver elements in the first and second portions. For example, the optimal distributions of the transceiver elements in the first and second portions can be calculated for each desired target elevation angle and target azimuth angle at a desired operation frequency. According to another example, the total range of the target elevation and target azimuth angles can be divided into several sub-ranges. Thus, for each sub-range of target elevation and target azimuth angles the optimal distributions of the transceiver elements in the first and second portions can be calculated at a desired frequency.

According to one embodiment of the present invention, calculation of the optimal distributions of the transceiver elements in the first and second portions is carried out in the signal processor system of the polarimetric phase array radar system of the present invention "on the fly", i.e., during operation of the system for tracking the target and determination of target parameters.

According to another embodiment of the present invention, calculation of the optimal distributions of the transceiver elements in the first and second portions is carried out in advance, for example, in the form of look-up tables. Thus, the look-up-tables can be stored in a memory of the signal processor system and used during operation of the system for tracking the target and determination of target parameters.

According to an embodiment of the present invention, calculated distributions of the transceiver elements in the first and second portions can be used for optimization of other elements of the polarimetric phase array radar system of the present invention. For example, the optimal distributions of the transceiver elements in the first and second portions can be used for optimal operation of the amplifier/attenuator(s) (243 in FIG. 2) of the transceiver elements 12 to provide desired tapering of power of the receiving signal components of the dual-polarization radar signal received on apertures of the antenna elements 21. The tapering of a power of the signal components of the radar signal can, for example, be required for reducing a level of the side lobs to a desired magnitude.

The tapering of a power of the signal components can be different for different distributions of the transceiver elements. According to an embodiment of the present invention, the optimal amplification or attenuation of magnitudes of the signal components can be determined "on the fly" during operation of the system for tracking the target. According to another embodiment, the optimal amplification or attenuation of magnitudes of the signal components are calculated in advance. These magnitudes can be stored in the form of look-up tables and utilized during operation of the system for tracking the target.

The scheme of dividing the array 11 of the transceiver elements 12 into the sub-arrays 1100 employs the interferometric technique for calculating target parameters. The interferometric technique uses right and left half parts (X and Y in FIG. 15A or FIG. 16A) for determination of the azimuth target angle and upper and lower half parts (I and J in FIG. 15B or FIG. 16A) of the array 11 for determination of the elevation target angle. The elements are all steered together using the phase shifters (233 in FIG. 2). The target is illuminated by all transceiver elements 12 of the two half parts equally. The signal processor system of the polarimetric phase array radar system can be used to process return signal components of the first type polarization and the second type of polarization received by the first and second portions of the transceiver elements, correspondingly, which are arranged in the right and left half parts of the array. For example, the two types of polarization can be horizontal polarization and a vertical polarization. Likewise, the two types of polarization can be left-handed circular polarization and right handed circular polarization.

For determination of the azimuth target angle, the processing includes generating phase difference signals $\Delta\varphi_1$ and $\Delta\varphi_2$ between the signal components received from the sub-arrays of the first and second portions of the left and right halves X and Y, correspondingly, and calculating distances $S_1$ and $S_2$ between the phase centers of the antenna elements of the first and second portions of the left and right halves X and Y.

The azimuth target angle $\theta az_1$ and $\theta az_2$ for the first type and second type of polarization, correspondingly, can be obtained by $$\theta az_1 = \sin^{-1}\left(\frac{\lambda\Delta\varphi_1}{2\pi S_1}\right)$$

$$\theta az_2 = \sin^{-1}\left(\frac{\lambda\Delta\varphi_2}{2\pi S_2}\right).$$

When desired, a weighted combination of phase difference signals $\Delta\varphi_1$ and $\Delta\varphi_2$ can be used for calculation of the azimuth target angle. Likewise, a weighted combination of the azimuth target angles $\theta az_1$ and $\theta az_2$ calculated for different polarization can be used.

For determination of the elevation target angle, the processing includes generating phase difference signals $\Delta\varphi_1$ and $\Delta\varphi_2$ between the signal components received from the sub-arrays of the first and second portions of the upper and lower halves I and J, correspondingly, and calculating distances $S_1$ and $S_2$ between the phase centers of the antenna elements of the first and second portions of the upper and lower halves I and J.

The azimuth target angle $\theta el_1$ and $\theta el_2$ for the first and second type of polarization, correspondingly, can be obtained by $$\theta el_1 = \sin^{-1}\left(\frac{\lambda\Delta\varphi_1}{2\pi S_1}\right)$$

-continued $$\theta el_2 = \sin^{-1}\left(\frac{\lambda\Delta\varphi_2}{2\pi S_2}\right).$$

When desired, a weighted combination of phase difference signals $\Delta\varphi_1$ and $\Delta\varphi_2$ can be used for calculation of the elevation target angle. Likewise, a weighted combination of the elevation target angles $\varphi el_1$ and $\theta el_2$ calculated for different polarization can be used.

Figure 17:
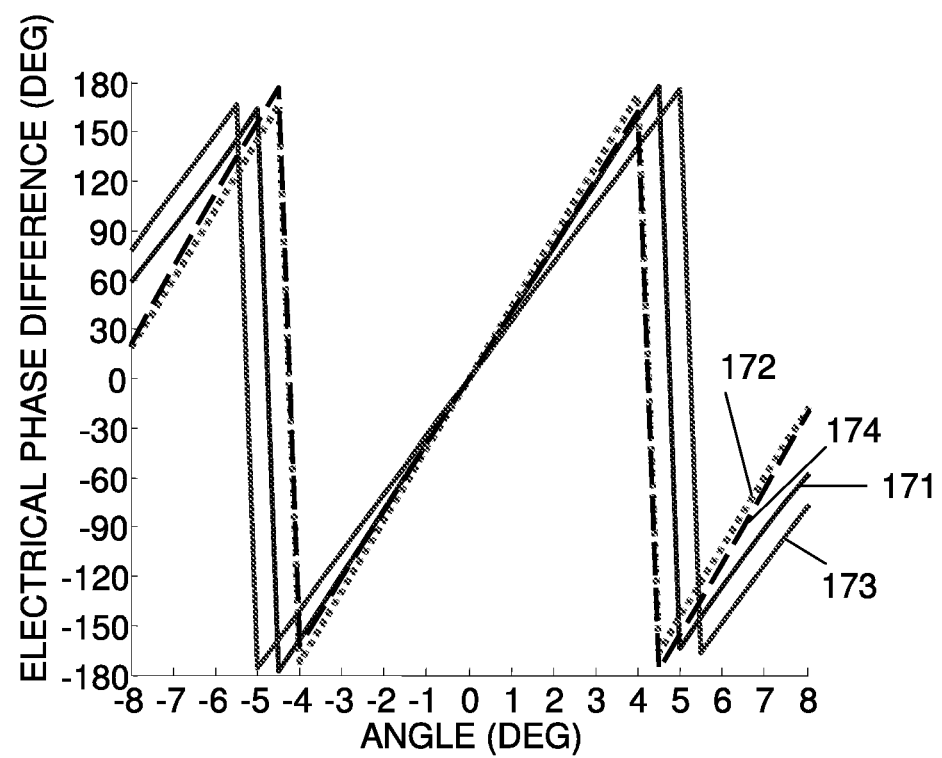
FIGS. 17-19 illustrate examples of dependencies between the phase difference signals of vertical and horizontal polarization versus the azimuth angle of the target for the case when the boresight angle equals 0 degrees, 30 degrees and 50 degrees, correspondingly.

Simulations were carried out for the distributions of the transceiver elements shown in FIGS. 15A and 16A for calculation of the dependencies between the phase difference signals $\Delta\varphi_1$ and $\Delta\varphi_2$ corresponding to the vertical and horizontal polarization versus the azimuth angle of the target. FIG. 17 illustrates examples of such dependencies for the case when the boresight angle equals 0 degrees. The curves 171 and 172 correspond to the distributions of the transceiver elements shown in FIG. 15A, i.e., when all the transceiver elements having the vertical and horizontal polarizations are located in the corresponding half parts X and Y of the array. In its turn, the curves 173 and 174 correspond to the distributions of the transceiver elements shown in 16A, corresponding to the case when a minority of the transceiver elements X1 and X2 are also located in the neighboring half part Y of the array.

Figure 18:
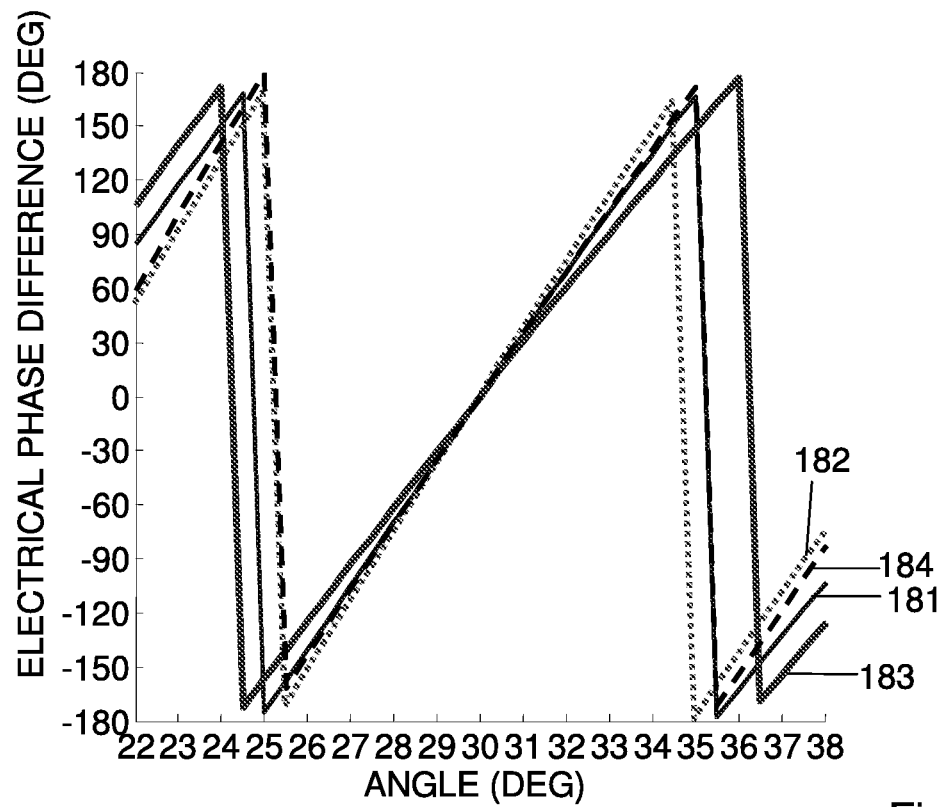
Figure 19:
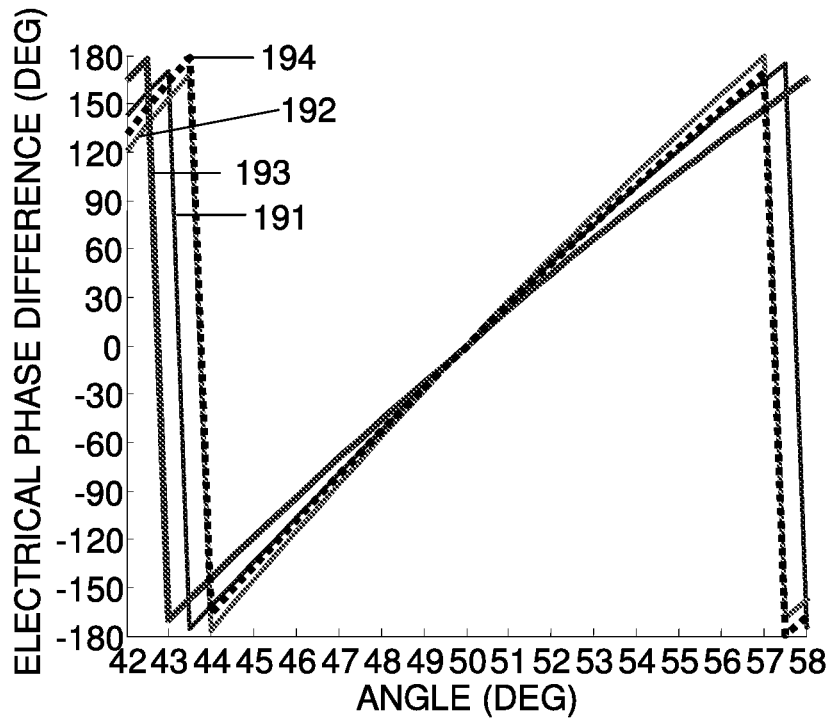

The technique of the present invention can also be used for determination of the azimuth and elevation angles when scanning at various boresight angles. FIGS. 18 and 19 illustrate examples of the dependencies between the phase difference signals of the vertical and horizontal polarization versus the azimuth angle of the target for the case when the boresight angle equals 30 and 50 degrees, correspondingly.

The curves 181, 182, 191 and 192 correspond to distributions of the transceiver elements shown in FIG. 15A, i.e., when all the transceiver elements having vertical and horizontal polarizations are located in the corresponding half parts X and Y of the array. In its turn, curves 183, 184, 193 and 194 correspond to distributions of the transceiver elements shown in 16A.

As such, those skilled in the art to which the present invention pertains, can appreciate that while the present invention has been described in terms of preferred embodiments, the concept upon which this disclosure is based may readily be utilized as a basis for the designing of other structures and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A polarimetric phase array radar system for determination of at least one target parameter selected from a target elevation angle and a target azimuth angle, comprising:

an array comprising a plurality of transceiver elements, each transceiver element being configured to transmit radar transmitting signal components of a dual-polarization radar signal having either a single type polarization or simultaneously two types of polarization and to receive a radar receiving signal component having a single type of polarization;

wherein
- in transmitting mode, each of said plurality of transceiver elements is operative to transmit a radar signal component having at least one type of polarization; and
- in receiving mode, for processing radar signal components, said plurality of transceiver elements of the array are divided into two sub-arrays, said two sub-arrays being arranged in two half parts of the array in two ways selected from:
  (i) a right half part and a left half part for determination of the target azimuth angle, and
  (ii) an upper half part and a lower half part for determination of the target elevation angle;
- each sub-array comprises a first portion of the transceiver elements and a corresponding second portion of the transceiver elements operating with a first type polarization and a second type of polarization, correspondingly;
- for each sub-array, the first portion of the transceiver elements and the second portion of the transceiver elements have phase centers located in the corresponding half part, and
- each sub-array is operative to receive a radar signal component having the first type polarization by the first portion of the transceiver elements having a first predetermined dynamic distribution adapted for optimization and depending at least on one characteristic selected from a total number of the transceiver elements, an operating frequency and said at least one target parameter; and simultaneously to receive a radar signal component having the second type polarization by the second portion of the transceiver elements having a second predetermined dynamic distribution adapted for optimization and depending at least on one characteristic selected from the total number of the transceiver elements, the operating frequency and said at least one target parameter; and
- a signal processing system coupled to the transceiver elements, and configured for processing radar receiving signal components having a single type of polarization by using a radar interferometric technique, and generating said at least one target parameter.

2. The system of claim 1, wherein for each sub-array of said two sub-arrays all the transceiver elements of the first and second portions are located in the corresponding half part of the array.

3. The system of claim 1, wherein for each sub-array of said two sub-arrays, a majority of the transceiver elements of the first and/or second portions is located in one half part of the array, while a minority of the transceiver elements of the first and/or second portions is located in a neighboring half part of the array.

4. The system of claim 1, wherein for each sub-array, the transceiver elements of said first portion are interleaved with the transceiver elements of said second portion.

5. The system of claim 1, wherein said two types of polarization are selected from a horizontal polarization and a vertical polarization.

6. The system of claim 1, wherein said two types of polarization are selected from a left-handed circular polarization and a right handed circular polarization.

7. The system of claim 1, wherein each transceiver element of said plurality of transceiver elements comprises:
- an antenna element comprising first and second multi-mode antenna feeds configured for transmitting and receiving a dual-polarization radar signal comprising first and second signal components having first and second types of polarization, correspondingly;
- a radio frequency source configured for generating a radar transmitting signal;
- a power distributing element electrically coupled to the radio frequency source, and configured to distribute the radar signal generated by the radio frequency source between a first line coupled to the first multi-mode antenna feed for transmitting the first signal component having the first type of polarization and a second line coupled to the second multi-mode antenna feed for transmitting the second signal component having the second type of polarization;
- first and second transmitter phase shifters arranged in the first and second lines downstream of the power distributing element, and configured to provide required phase shifts to first and second transmitting signal components transferred in the first and second lines, correspondingly;
- a first duplexer and a second duplexer arranged downstream of the first and second phase shifters, correspondingly, and configured
  - in transmitting mode, to provide shifted transmitting signal components in the first and second transmitting lines to the first and second multi-mode antenna feeds for transmitting the first and second transmitting signal components having the first and second types of polarization, correspondingly; and
  - in receiving mode, to receive first and second receiving signal components having the first and second types of polarization provided by the first and second multi-mode antenna feeds and to provide the first and second receiving signal components to a receiving line;
- a selecting switch arranged in the receiving line and coupled to the first and a second duplexers and configured for switching between receiving the first receiving signal component provided by the antenna element and having the first type of polarization and the second receiving signal component provided by the antenna element and having the second type of polarization;
- a receiver phase shifter coupled to the selecting switch and configured (i) to receive the first receiving signal component having the first type of polarization from the selecting switch when the selecting switch being in a first position, (ii) to receive the second receiving signal component having the second type of polarization when the selecting switch is in a second position, (iii) to provide a required phase shift to the receiving signal component transferred through the receiver phase shifter, and (iv) to generate a shifted receiving signal component of a single type of polarization.

8. A polarimetric phase array radar system for determination of at least one target parameter selected from a target range, a target elevation angle and a target azimuth angle, comprising:
an array comprising a plurality of transceiver elements, each transceiver element being configured to transmit radar transmitting signal components of a dual-polarization radar signal having either a single type polarization or simultaneously two types of polarization and to receive a radar receiving signal component having a single type of polarization;

wherein in transmitting mode, said plurality of transceiver elements are operative to transmit a radar signal component having at least one type of polarization; and in receiving mode, for processing radar signal components, said plurality of transceiver elements of the array are divided into four sub-arrays arranged in four quadrant parts of the array selected from: an upper left quadrant part, an upper right quadrant part, a lower left quadrant part and a lower right quadrant part of the array;

each sub-array comprises a first portion of the transceiver elements and a corresponding second portion of the transceiver elements operating with a first type of polarization and a second type of polarization, correspondingly;

for each sub-array, the first portion of the transceiver elements and second portion of the transceiver elements have phase centers located in the corresponding quadrant part, and each sub-array is operative to receive a radar signal component having the first type polarization by the first portion of the transceiver elements having a first predetermined dynamic distribution adapted for optimization and depending at least on one characteristic selected from a total number of the transceiver elements, an operating frequency and said at least one target parameter, and simultaneously to receive a radar signal component having the second type polarization by the second portion of the transceiver elements having a second predetermined dynamic distribution adapted for optimization and depending at least on one characteristic selected from the total number of the transceiver elements, the operating frequency and said at least one target parameter; and a signal processing system coupled to the transceiver elements, and configured for processing radar receiving signal components having a single type of polarization by using a monopulse radar technique, and generating said at least one target parameter.

9. The system of claim 8, wherein for each sub-array of said four sub-arrays all the transceiver elements of the first and second portions are located in the corresponding quadrant part of the array.

10. The system of claim 8, wherein for each sub-array of said four sub-arrays, a majority of the transceiver elements of the first and/or second portions is located in one quadrant part of the array, while a minority of the transceiver elements of the first and/or second portions is located in neighboring quadrant parts of the array.

11. The system of claim 8, wherein for each sub-array, the transceiver elements of said first portion are interleaved with the transceiver elements of said second portion.

12. The system of claim 8, wherein said two types of polarization are selected from a horizontal polarization and a vertical polarization.

13. The system of claim 8, wherein said two types of polarization are selected from a left-handed circular polarization and a right handed circular polarization.

14. The system of claim 8, wherein each transceiver element of said plurality of transceiver elements comprises:

an antenna element comprising first and second multimode antenna feeds configured for transmitting and receiving a dual-polarization radar signal comprising first and second signal components having first and second types of polarization, correspondingly;

a radio frequency source configured for generating a radar transmitting signal;

a power distributing element electrically coupled to the radio frequency source, and configured to distribute the radar signal generated by the radio frequency source between a first line coupled to the first multi-mode antenna feed for transmitting the first signal component having the first type of polarization and a second line coupled to the second multi-mode antenna feed for transmitting the second signal component having the second type of polarization;

first and second transmitter phase shifters arranged in the first and second lines downstream of the power distributing element, and configured to provide required phase shifts to first and second transmitting signal components transferred in the first and second lines, correspondingly;

a first duplexer and a second duplexer arranged downstream of the first and second phase shifters, correspondingly, and configured in transmitting mode, to provide shifted transmitting signal components in the first and second transmitting lines to the first and second multi-mode antenna feeds for transmitting the first and second transmitting signal components having the first and second types of polarization, correspondingly; and in receiving mode, to receive first and second receiving signal components having the first and second types of polarization provided by the first and second multi-mode antenna feeds and to provide the first and second receiving signal components to a receiving line;

a selecting switch arranged in the receiving line and coupled to the first and a second duplexers and configured for switching between receiving the first receiving signal component provided by the antenna element and having the first type of polarization and the second receiving signal component provided by the antenna element and having the second type of polarization;

a receiver phase shifter coupled to the selecting switch and configured (i) to receive the first receiving signal component having the first type of polarization from the selecting switch when the selecting switch being in a first position, (ii) to receive the second receiving signal component having the second type of polarization when the selecting switch is in a second position, (iii) to provide a required phase shift to the receiving signal component transferred through the receiver phase shifter, and (iv) to generate a shifted receiving signal component of a single type of polarization.

15. A method of operating a polarimetric phase array radar system for determination of at least one target parameter selected from a target elevation angle and a target azimuth angle, comprising:

providing an array comprising a plurality of transceiver elements, each transceiver element is configured to transmit radar signal components of a dual-polarization radar signal having either a single type polarization or simultaneously two types of polarization and to receive a radar signal component having a single type of polarization;

wherein in the transmitting mode, operating said plurality of transceiver elements to transmit a radar signal component having at least one type of polarization; and wherein in the receiving mode, selecting two sub-arrays from said array of the plurality of transceiver elements, said two sub-arrays being arranged in two half parts of the array in two ways selected from:
  (i) a right half part and a left half part for determination of the target azimuth angle, and
  (ii) an upper half part and a lower half part for determination of the target elevation angle;

each sub-array comprising a first portion of the transceiver elements operating with a first type of polarization and a corresponding second portion of the transceiver elements operating with a second type of polarization;

for each sub-array,
  providing a first predetermined dynamic distribution adapted for optimization to the first portion of the transceiver elements and a second predetermined dynamic distribution adapted for optimization to the second portion of the transceiver elements; the first and second predetermined dynamic distributions depending at least on one characteristic selected from a total number transceiver elements, an operating frequency and said at least one parameter of the target;
  receiving a radar signal component having one type of polarization by a first portion of the transceiver elements and simultaneously receiving a radar signal component having the second type of polarization by a second portion of the transceiver elements; and
  calculating said at least one parameter of the target by using a radar interferometric technique.

16. The method of claim 15, wherein calculating said at least one target parameter by using the radar interferometric technique comprises:
  generating a phase difference signal between the signal components having at least one type of polarization received from the two sub-arrays arranged in
    (i) a right half part and a left half part for determination of the target azimuth angle, and/or
    (ii) an upper half part and a lower half part for determination of the target elevation angle;
  calculating a distance between phase centers of the transceiver elements of said two sub-arrays for at least one portion of the transceiver elements selected from the first portion and second portion and corresponding to said at least one type of polarization; and
  processing said phase difference signal and the distance between the phase centers for generating said at least one target parameter.

17. The method of claim 15, comprising tapering of a power of the signal components of the radar signal received on an aperture of antenna elements for reducing side lobs level to a desired magnitude.

18. A method of operating a polarimetric phase array radar system for determination of at least one target parameter, comprising:
  providing an array comprising a plurality of transceiver elements, each transceiver element is configured to transmit radar signal components of a dual-polarization radar signal having either a single type polarization or simultaneously two types of polarization and to receive a radar signal component having a single type of polarization;

wherein in the transmitting mode, operating said plurality of transceiver elements to transmit a radar signal component having at least one type of polarization; and wherein in the receiving mode, dividing the array of said plurality of transceiver elements into four sub-arrays arranged in four quadrant parts of the array selected from: an upper left quadrant part, an upper right quadrant part, a lower left quadrant part and a lower right quadrant part of the array;

each sub-array comprises a first portion of the transceiver elements and a corresponding second portion of the transceiver elements operating with a first type of polarization and a second type of polarization, correspondingly;\ for each sub-array,
  providing a first predetermined dynamic distribution adapted for optimization to the first portion of the transceiver elements and a second predetermined dynamic distribution adapted for optimization to the second portion of the transceiver elements; the first and second predetermined dynamic distributions depending at least on one characteristic selected from a total number transceiver elements, an operating frequency and said at least one parameter of the target;
  receiving a radar signal component having one type of polarization by a first portion of the transceiver elements and simultaneously receiving a radar signal component having the second type of polarization by a second portion of the transceiver elements; and
  calculating said at least one parameter of the target by using a monopulse tracking technique.

19. The method of claim 18, wherein said calculating of said at least one parameter of the target by applying the monopulse tracking technique comprises:
  summing signal components having at least one type of polarization received from the four sub-arrays to calculate a four sub-array sum signal ($\Sigma$);
  summing signal components having at least one type of polarization received from any two sub-arrays to calculate a first two sub-array sum signal and from two other sub-arrays to calculate a second two sub-array sum signal;
  generating a difference signal ($\Delta$) between said first two sub-array sum signal and said second two sub-array sum signal; and
processing said four sub-array sum signal ($\Sigma$) and said difference signal ($\Delta$) for generating said at least one parameter of the target.

20. The method of claim 18, comprising tapering of a power of the signal components of the radar signal received on an aperture of antenna elements for reducing side lobs level to a desired magnitude.

* * * * *